US009448765B2

(12) United States Patent
Anderson et al.

(10) Patent No.: US 9,448,765 B2
(45) Date of Patent: Sep. 20, 2016

(54) FLOATING POINT SCALING PROCESSORS, METHODS, SYSTEMS, AND INSTRUCTIONS

(75) Inventors: Christina S. Anderson, Hillsboro, OR (US); Amit Gradstein, Binyamina (IL); Robert Valentine, Kiryat Tivon (IL); Simon Rubanovich, Haifa (IL); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 455 days.

(21) Appl. No.: 13/977,086

(22) PCT Filed: Dec. 28, 2011

(86) PCT No.: PCT/US2011/067684
§ 371 (c)(1),
(2), (4) Date: Jun. 28, 2013

(87) PCT Pub. No.: WO2013/101010
PCT Pub. Date: Jul. 4, 2013

(65) Prior Publication Data
US 2015/0088946 A1  Mar. 26, 2015

(51) Int. Cl.
*G06F 7/483* (2006.01)
*G06F 9/30* (2006.01)
(52) U.S. Cl.
CPC ........... *G06F 7/483* (2013.01); *G06F 9/30014* (2013.01); *G06F 9/30036* (2013.01)
(58) Field of Classification Search
None
See application file for complete search history.

(56) References Cited

U.S. PATENT DOCUMENTS

| 6,425,074 | B1 | 7/2002 | Meier et al. |
| 6,675,286 | B1 | 1/2004 | Sun et al. |
| 7,330,864 | B2 * | 2/2008 | Yuval ...................... G06F 7/483 |
| | | | 708/208 |
| 2004/0267853 | A1 | 12/2004 | Fossum et al. |
| 2009/0083357 | A1 | 3/2009 | Muff et al. |

FOREIGN PATENT DOCUMENTS

| TW | I269228 B | 12/2006 |
| TW | I275028 B | 3/2007 |
| TW | I325120 B | 5/2010 |
| WO | 2013/101010 A1 | 7/2013 |

OTHER PUBLICATIONS

International Preliminary Report on Patentability and Written Opinion received for PCT Patent Application No. PCT/US2011/067684, mailed on Jul. 10, 2014, 7 pages.

(Continued)

*Primary Examiner* — Michael D Yaary
(74) *Attorney, Agent, or Firm* — Vecchia Patent Agent, LLC

(57) ABSTRACT

A method of an aspect includes receiving a floating point scaling instruction. The floating point scaling instruction indicates a first source including one or more floating point data elements, a second source including one or more corresponding floating point data elements, and a destination. A result is stored in the destination in response to the floating point scaling instruction. The result includes one or more corresponding result floating point data elements each including a corresponding floating point data element of the second source multiplied by a base of the one or more floating point data elements of the first source raised to a power of an integer representative of the corresponding floating point data element of the first source. Other methods, apparatus, systems, and instructions are disclosed.

31 Claims, 31 Drawing Sheets

(56) References Cited

OTHER PUBLICATIONS

Office Action received for Taiwan Patent Application No. 101148754, mailed on Jun. 26, 2015, 4 pages of English Translation and 4 pages of Taiwan Office Action.

"Notification of Transmittal of the International Search Report and the Written Opinion of the International Searching Authority, or the Declaration" mailed Jun. 7, 2012 p. 10, in PCT/US2011/067684.

* cited by examiner

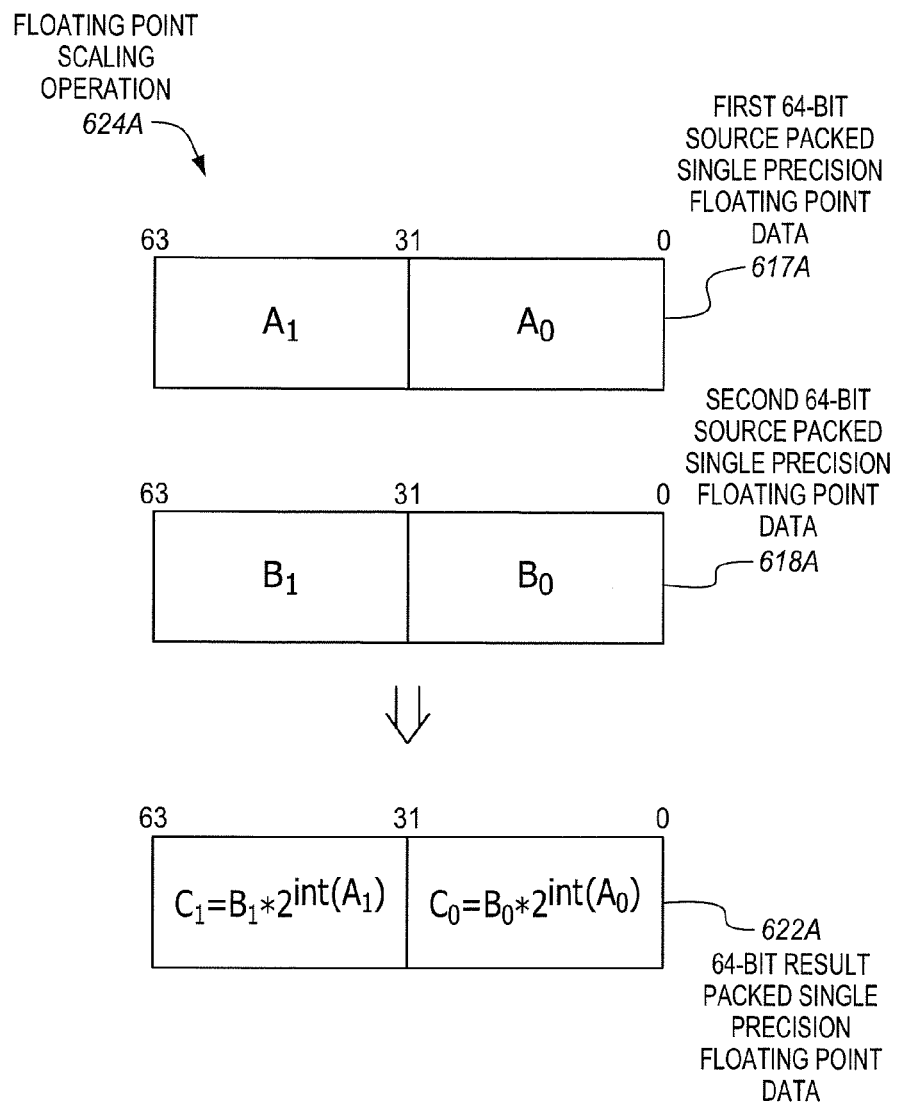

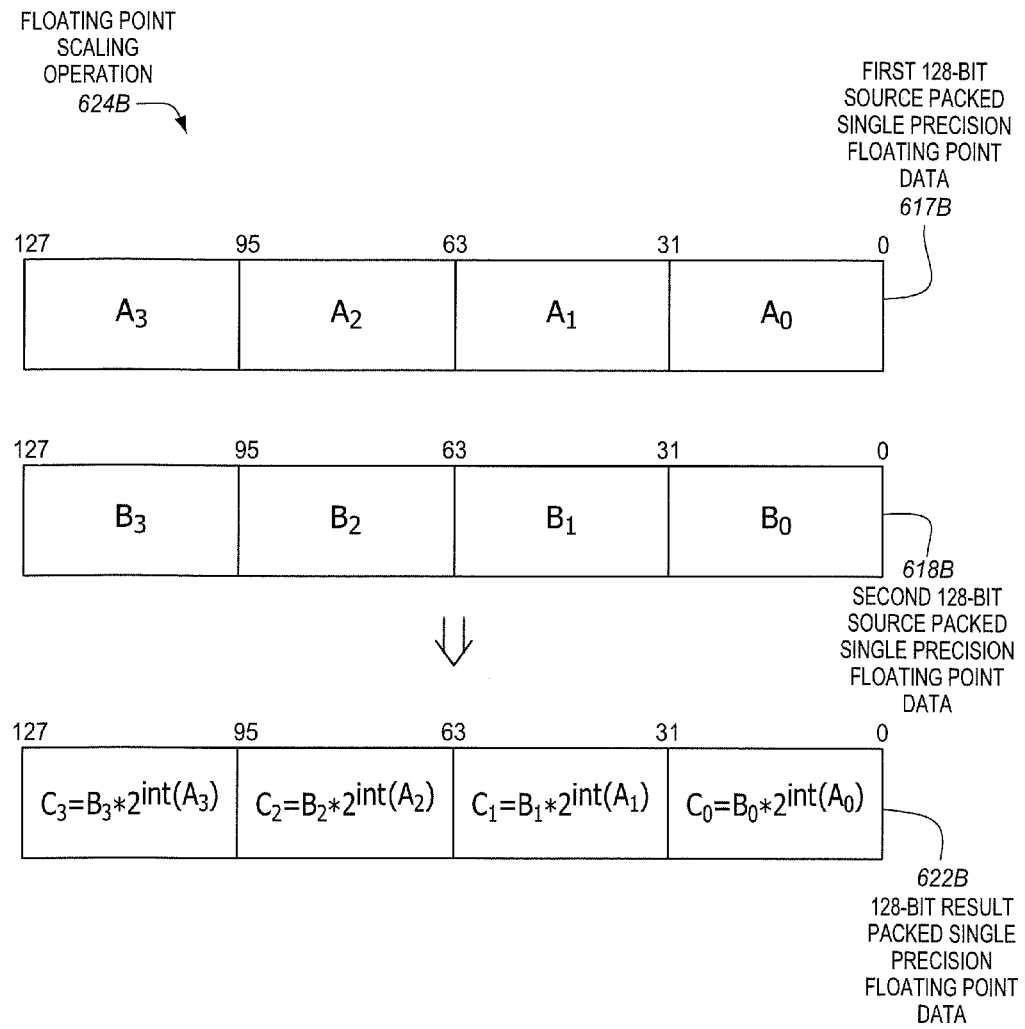

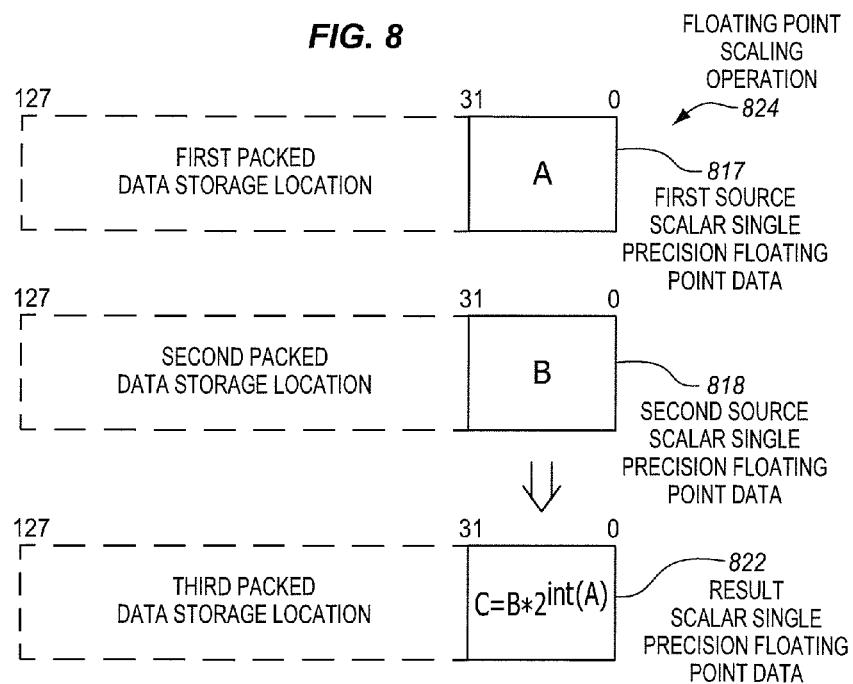
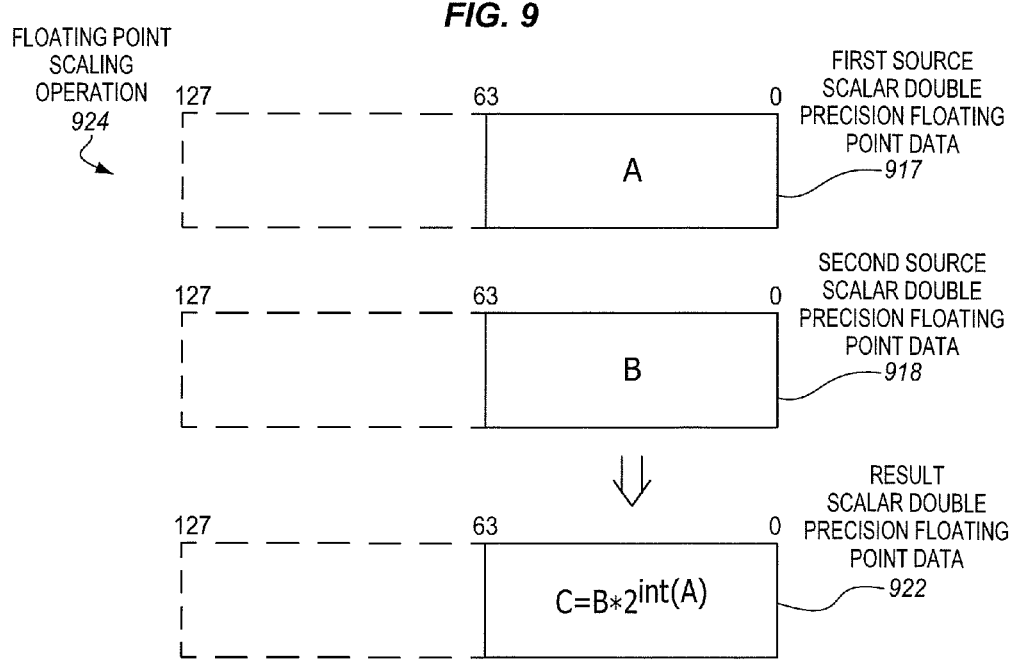

FIG. 14

FLOATING POINT SCALING INSTRUCTION 1403

| OPCODE 1433 | FIRST SOURCE SPECIFIER 1434 | SECOND SOURCE SPECIFIER 1435 | DESTINATION SPECIFIER 1436 | DATA ELEMENT BROADCAST CONTROL 1437 | PACKED DATA OPERATION MASK SPECIFIER 1438 | TYPE OF MASKING OPERATION SPECIFIER 1439 | FLOATING POINT ROUNDING CONTROL 1440 |

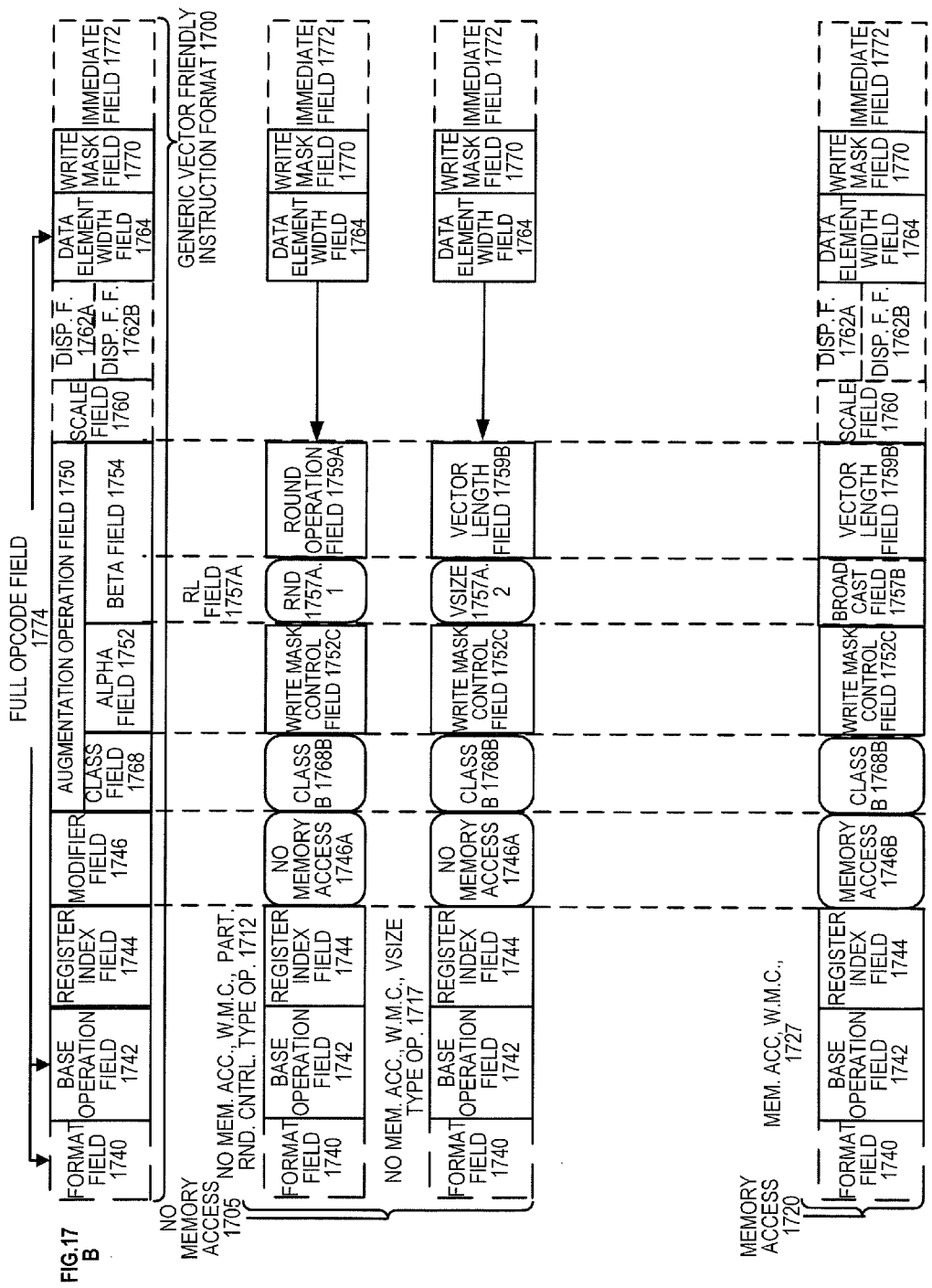

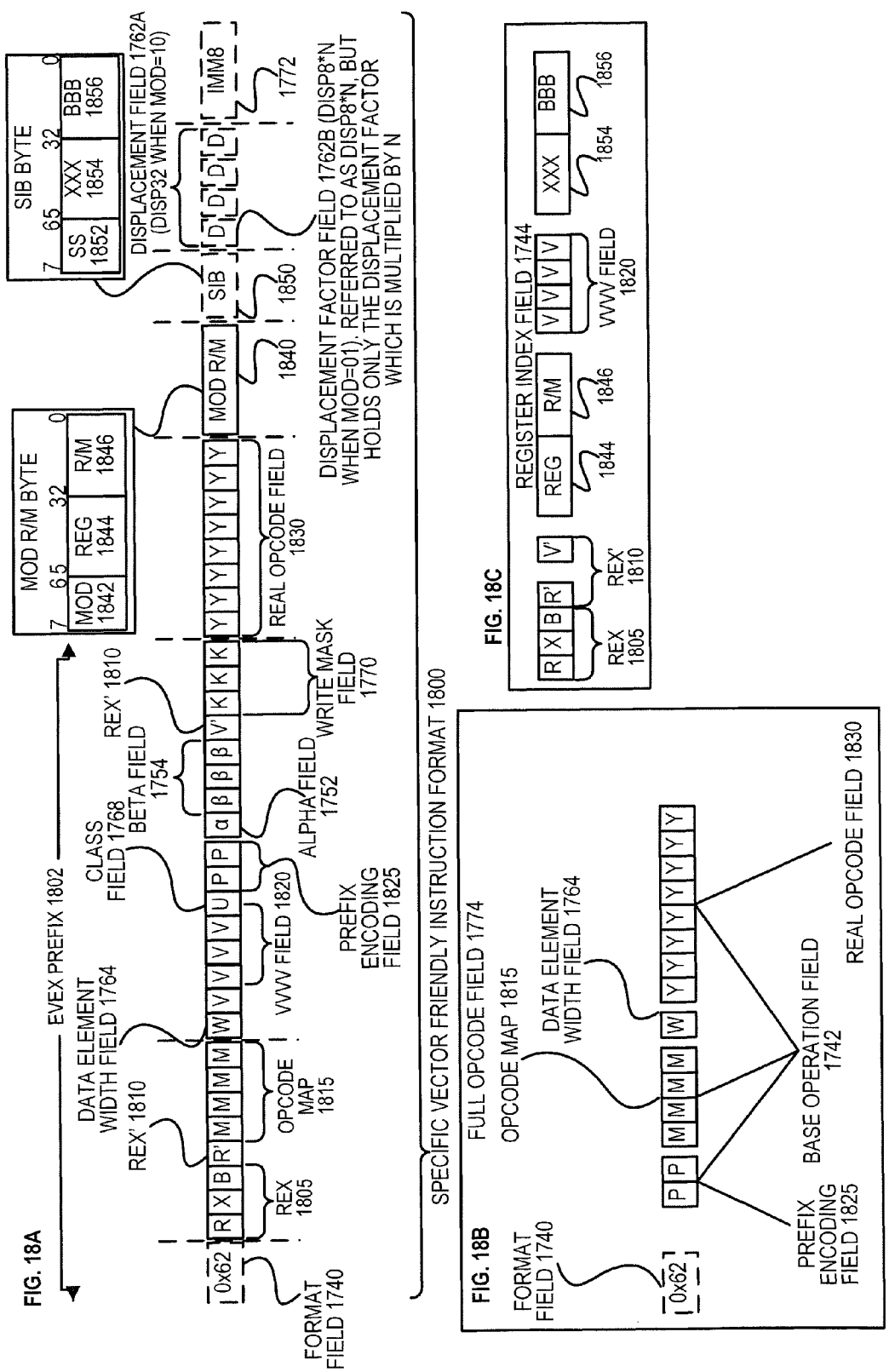

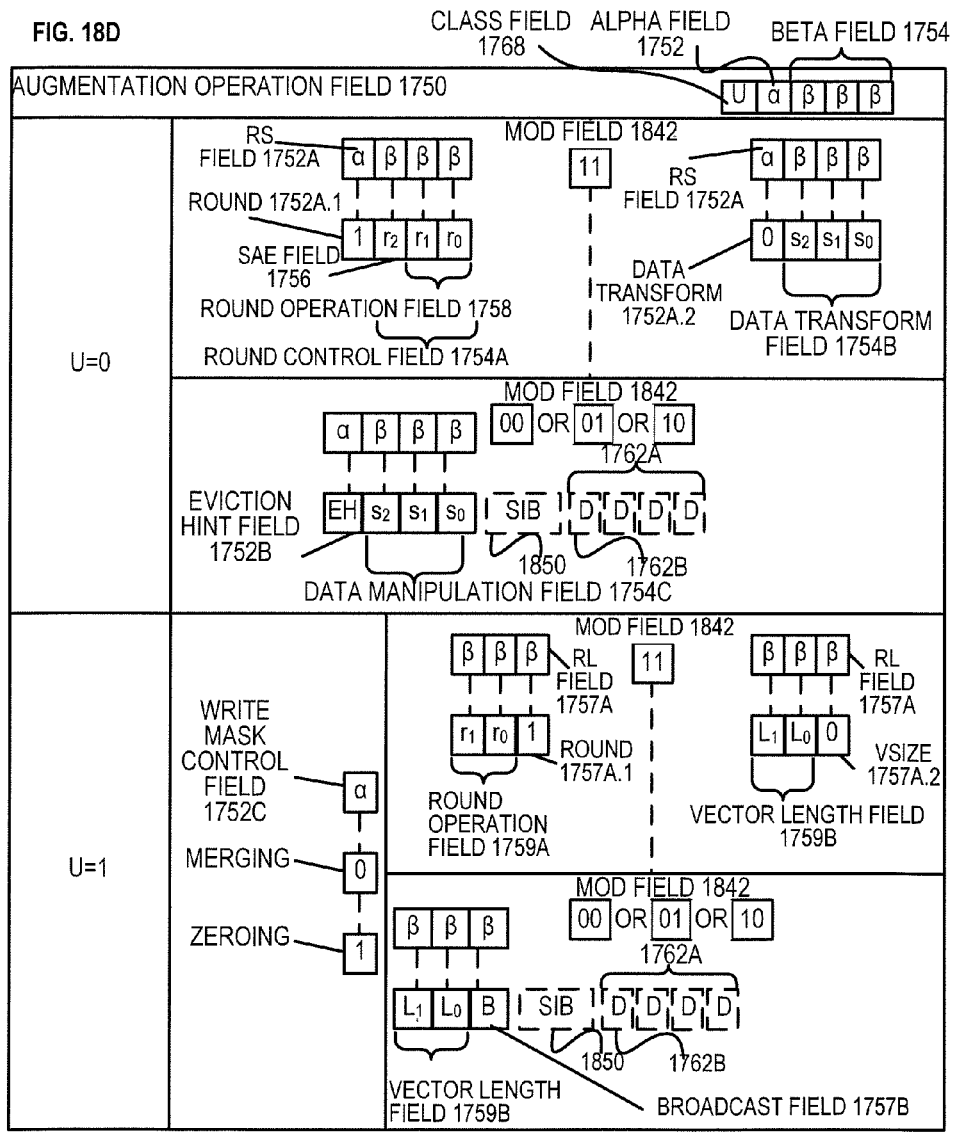

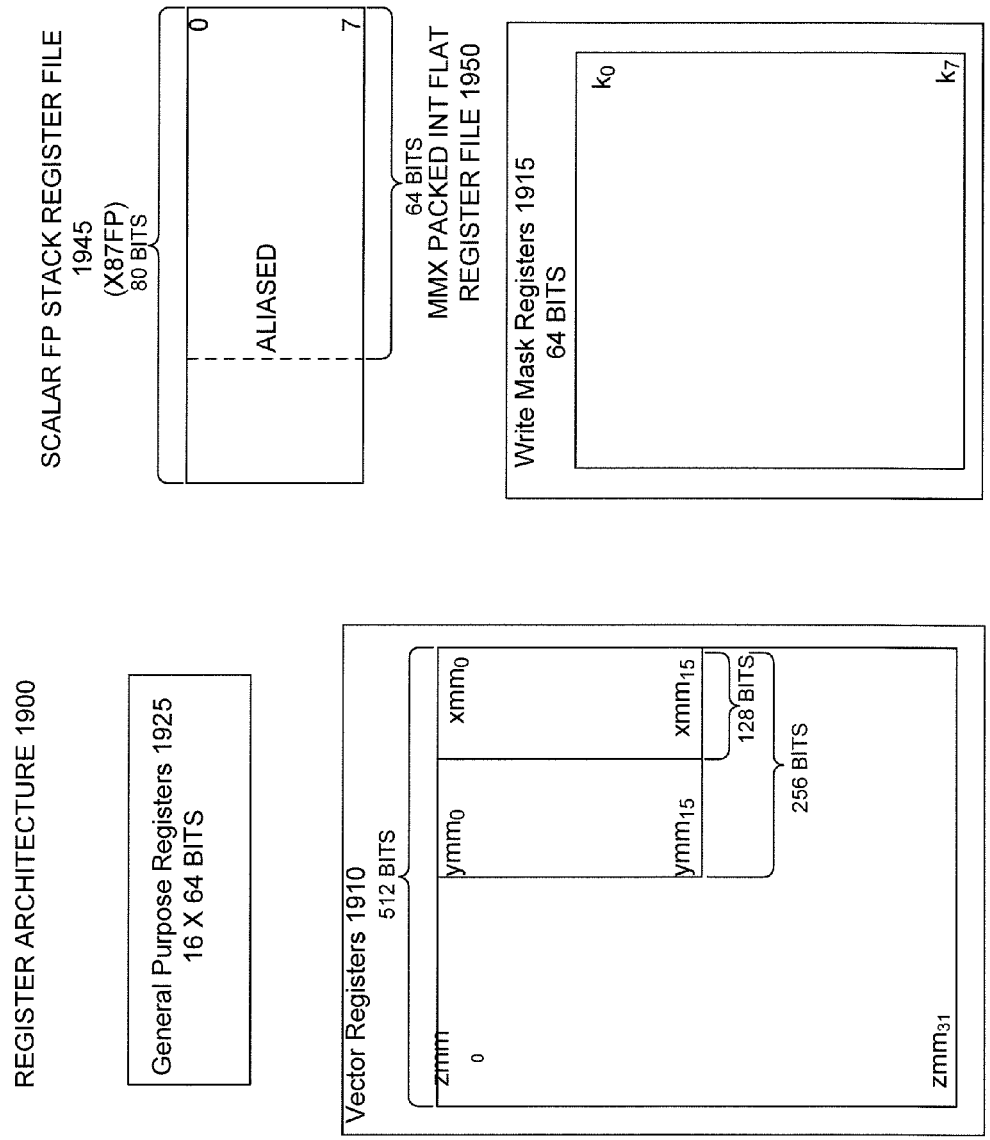

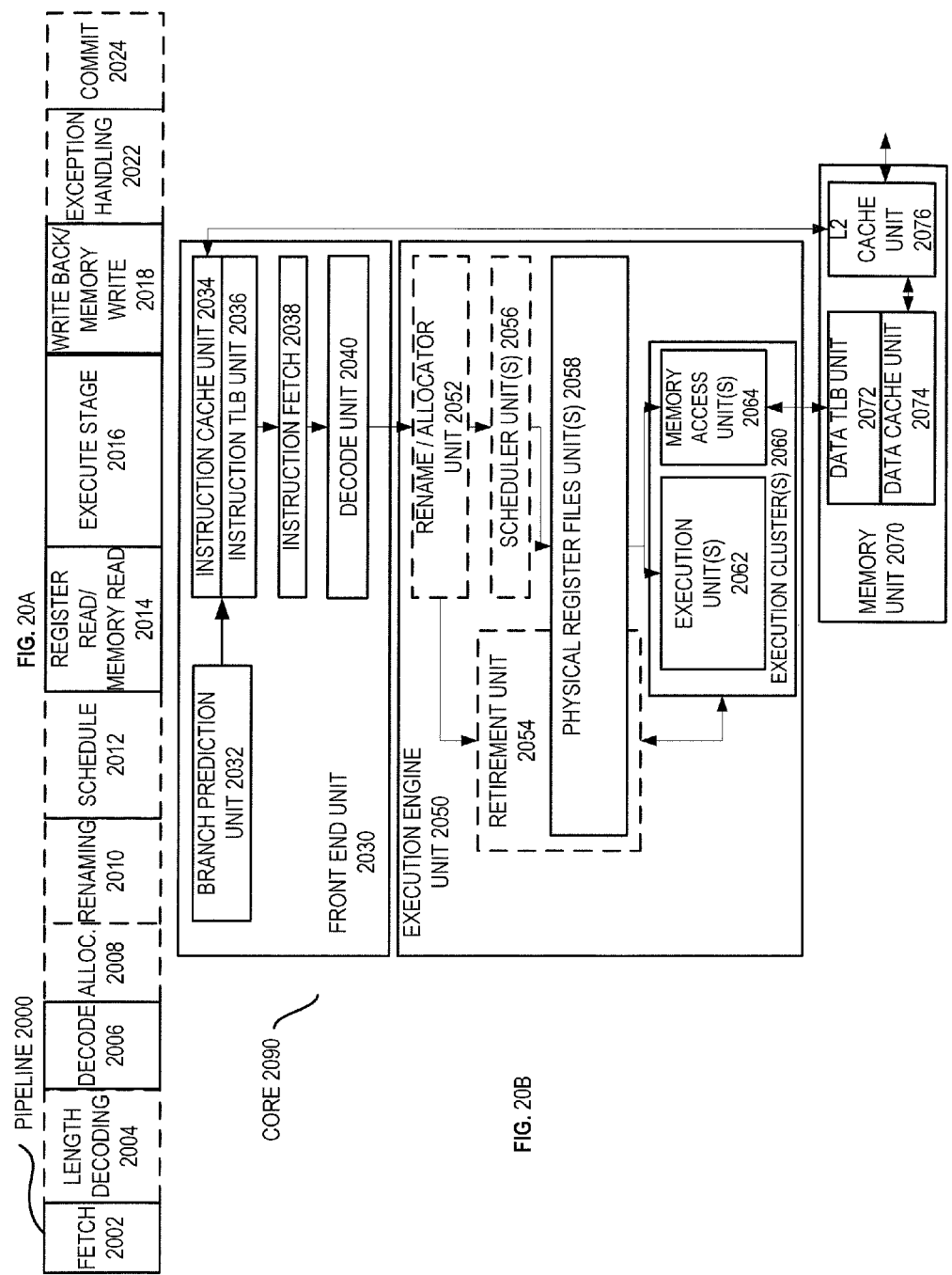

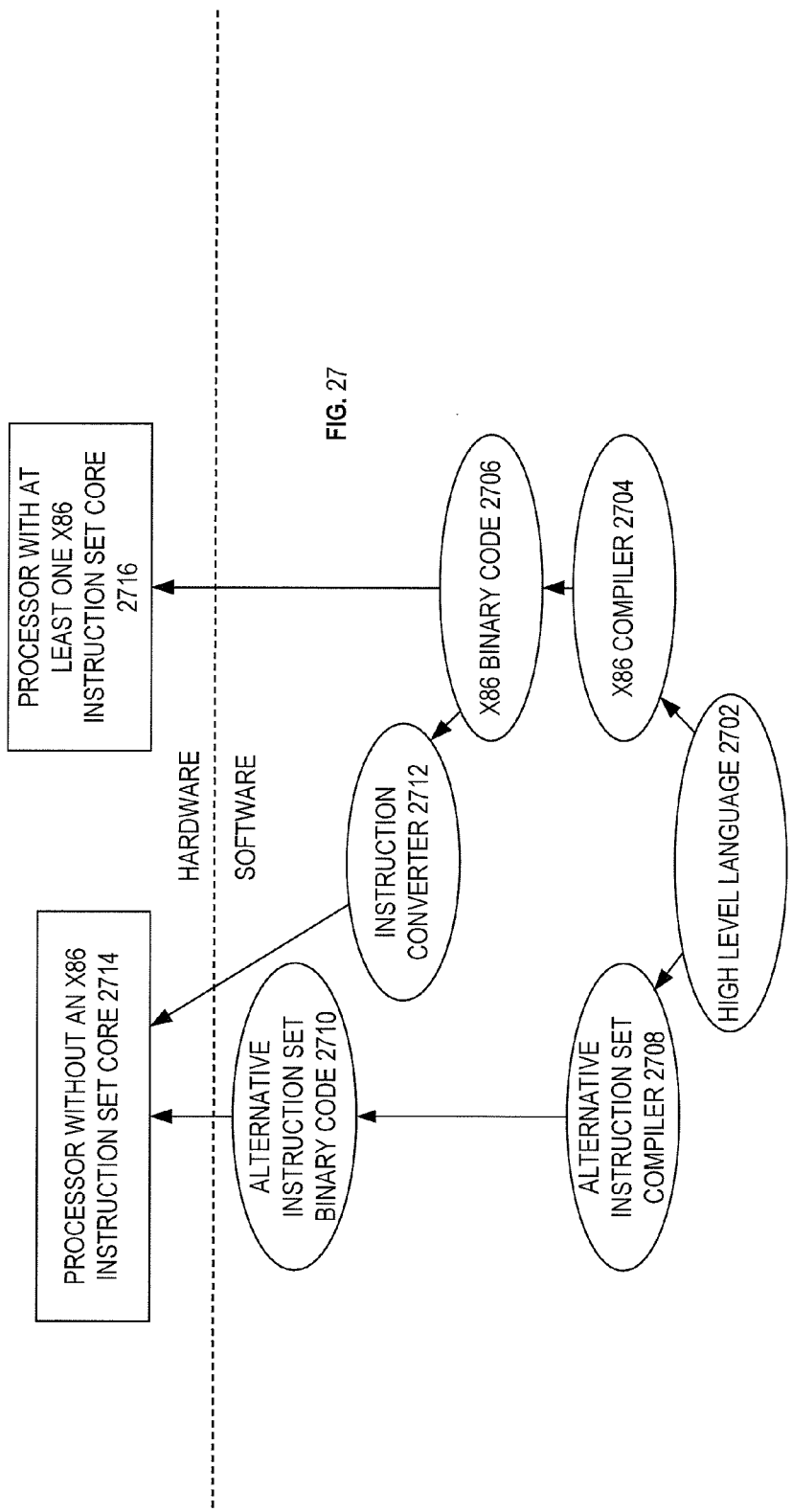

FLOATING POINT SCALING PROCESSORS, METHODS, SYSTEMS, AND INSTRUCTIONS

CROSS-REFERENCE TO RELATED APPLICATION

This patent application is a U.S. National Phase Application under 35 U.S.C. §371 of International Application No. PCT/US2011/067684, filed Dec. 28, 2011, entitled FLOATING POINT SCALING PROCESSORS, METHODS, SYSTEMS, AND INSTRUCTIONS.

BACKGROUND

1. Field

Embodiments relate to processors. In particular, embodiments relate to processors to scale floating point numbers responsive to floating point scaling instructions.

2. Background Information

Floating point numbers are commonly used in processors, computer systems, and other electronic devices. One advantage of floating point numbers is that they allow a wide range of numerical values to be represented in a relatively compact numerical format and/or number of bits.

A number of different floating point formats are known in the art. The floating point format typically apportions the bits used to represent the floating point number into several constituent fields known as the sign, the significand, and the exponent of the floating point number.

Various machine instructions are known in the art for processing floating point numbers. For example, machine instructions are known in the art for converting between floating point and integer values.

BRIEF DESCRIPTION OF THE SEVERAL VIEWS OF THE DRAWINGS

The invention may best be understood by referring to the following description and accompanying drawings that are used to illustrate embodiments. In the drawings:

FIG. 6A-C are block diagrams illustrating embodiments of floating point scaling operations that may be performed on packed 32-bit single precision floating point data.

FIG. 8 is a block diagram illustrating an embodiment of a floating point scaling operation that may be performed on scalar 32-bit single precision floating point data.

FIG. 9 is a block diagram illustrating an embodiment of a floating point scaling operation that may be performed on scalar 64-bit double precision floating point data.

FIG. 14 is a block diagram of an embodiment of an instruction format for a floating point scaling instruction.

FIG. 17B is a block diagram illustrating the generic vector friendly instruction format and class B instruction templates thereof according to embodiments of the invention.

FIG. 18 is a block diagram illustrating an exemplary specific vector friendly instruction format according to embodiments of the invention.

FIG. 18B is a block diagram illustrating the fields of the specific vector friendly instruction format that make up the full opcode field according to one embodiment of the invention.

FIG. 18C is a block diagram illustrating the fields of the specific vector friendly instruction format that make up the register index field according to one embodiment of the invention.

FIG. 18D is a block diagram illustrating the fields of the specific vector friendly instruction format that make up the augmentation operation field according to one embodiment of the invention.

FIG. 19 is a block diagram of a register architecture according to one embodiment of the invention.

FIG. 20A is a block diagram illustrating both an exemplary in-order pipeline and an exemplary register renaming, out-of-order issue/execution pipeline according to embodiments of the invention.

FIG. 20B shows processor core including a front end unit coupled to an execution engine unit, and both are coupled to a memory unit.

FIG. 27 is a block diagram contrasting the use of a software instruction converter to convert binary instructions in a source instruction set to binary instructions in a target instruction set according to embodiments of the invention.

DETAILED DESCRIPTION

Disclosed herein are floating point scaling instructions, processors to execute the floating point scaling instructions, methods performed by the processors when processing or executing the floating point scaling instructions, and systems incorporating one or more processors to process or execute the floating point scaling instructions. Any of the various processors and systems disclosed herein is suitable. In the following description, numerous specific details are set forth (e.g., specific processor configurations, sequences of operations, instruction formats, floating point formats, microarchitectural details, etc.). However, embodiments may be practiced without these specific details. In other instances, well-known circuits, structures and techniques have not been shown in detail to avoid obscuring the understanding of the description.

It is often useful to scale floating point numbers. Scaling the floating point numbers refers to multiplying the floating point numbers by a base raised to a power of another number. Specifically, it is often useful to scale the floating point numbers by multiplying each of them by a base raised to an integer power. Commonly, the integer power is derived from another floating point number. One exemplary use of such scaling of floating point numbers is in the reconstruction of floating point numbers from separated exponent and significand pairs. By way of example, the exponents and significands of the floating point numbers may be extracted or separated from one another, and then the separated exponents and significands may be separately processed through a series of calculations. Subsequently, after such separate processing, floating point numbers may be reassembled or reconstructed by combining their separately processed exponents and significands. Scaling of floating point numbers is also useful for other purposes (e.g., as a general operation on floating point numbers, in conjunction with processing exponentials, square roots, logarithms, trigonometric functions, and other transcendental functions, etc.)

Figure 1:
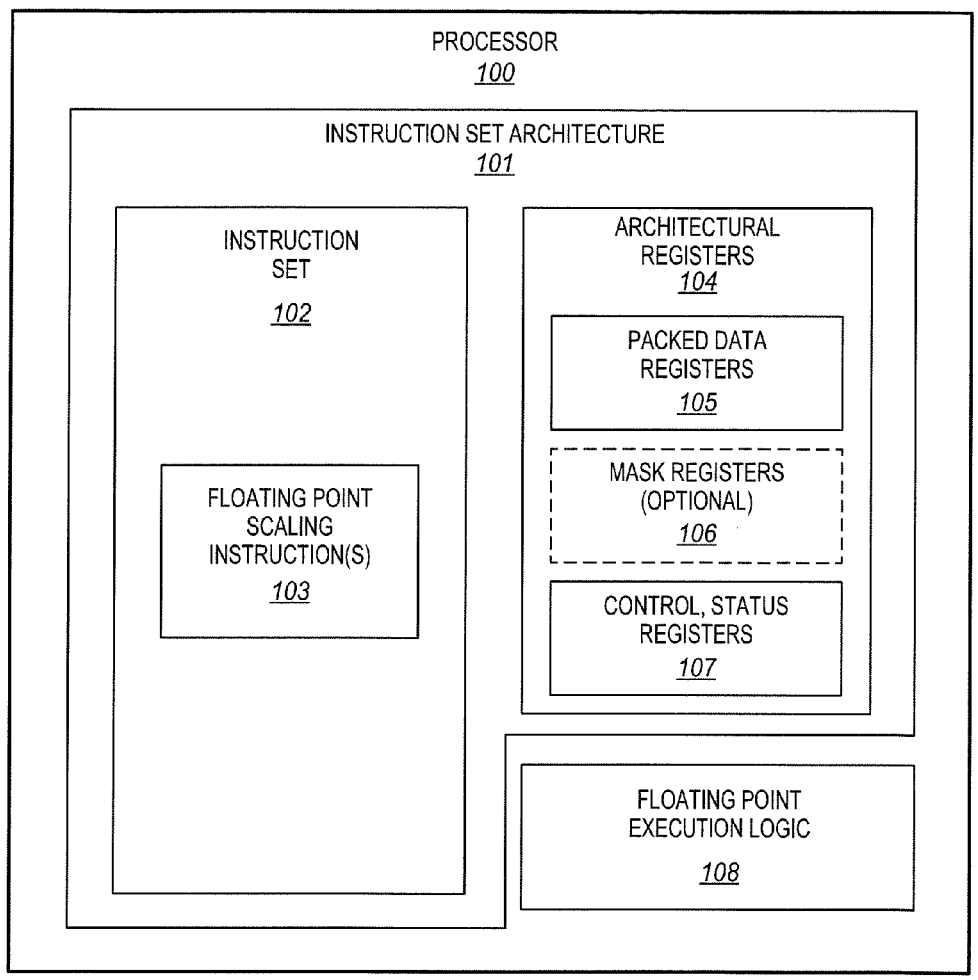
FIG. 1 is a block diagram of an embodiment of a processor having an instruction set that includes one or more floating point scaling instructions.

FIG. 1 is a block diagram of an embodiment of a processor 100 having an instruction set 102 that includes one or more floating point scaling instructions 103. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., a general-purpose microprocessor of the type used in desktop, laptop, and like computers). Alternatively, the processor may be a special-purpose processor. Examples of suitable special-purpose processors include, but are not limited to, network processors, communications processors, cryptographic processors, graphics processors, coprocessors, embedded processors, digital signal processors (DSPs), floating point coprocessors, and controllers (e.g., microcontrollers), to name just a few examples.

The processor has an instruction set architecture (USA) 101. The ISA represents a part of the architecture of the processor related to programming. The ISA commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the ISA. Processors with different microarchitectures may share a common ISA.

The ISA includes an instruction set 102 that is supported by the processor. The instructions of the instruction set represent macroinstructions (e.g., instructions provided to the processor for execution), as opposed to microinstructions or micro-ops (e.g., those which result from a decoder of the processor decoding macroinstructions). The instruction set includes one or more floating point scaling instructions 103. Various different embodiments of floating point scaling instructions will be disclosed further below. The processor also includes floating point execution logic 108 operable to execute or process the floating point scaling instructions 103.

The ISA also includes architecturally-visible registers (e.g., an architectural register file) 104. The architectural registers generally represent on-die processor storage locations. The architectural registers may also be referred to herein simply as registers. Unless otherwise specified or apparent, the phrases architectural register, register file, and register are used herein to refer to registers that are visible to the software and/or programmer (e.g., software-visible) and/or the registers that are specified by general-purpose macroinstructions to identify operands. These registers are contrasted to other non-architectural or non-architecturally visible registers in a given microarchitecture (e.g., temporary registers used by instructions, reorder buffers, retirement registers, etc.).

The illustrated architectural registers include packed data registers 105. Each of the packed data registers is operable to store packed data, vector data, or SIMD data. In some embodiments, the packed data registers may be used to store packed floating point data associated with the floating point scaling instruction(s) 103. In some embodiments, the packed data registers may also be able to store integer data, although this is not required. In some embodiments, the packed data registers may be used to store scalar floating point data associated with the floating point scaling instruction(s). Alternatively, the architectural registers may include a separate set of scalar floating point registers to respectively store scalar floating point data for the floating point scaling instruction(s).

In some embodiments, the registers may optionally include mask registers 106, although this is not required. The mask registers may store packed data operation masks to mask or predicate packed data operations (e.g. packed data operations associated with the floating point scaling instructions). Mask registers and masked operations will be discussed further below.

The registers also include control and/or status registers 107. In some aspects, one or more of the control and/or status registers may include status and/or control information associated with execution of the floating point scaling instructions (e.g., they may include a default rounding mode to be used by the floating point scaling instructions unless there is an override).

Figure 2:
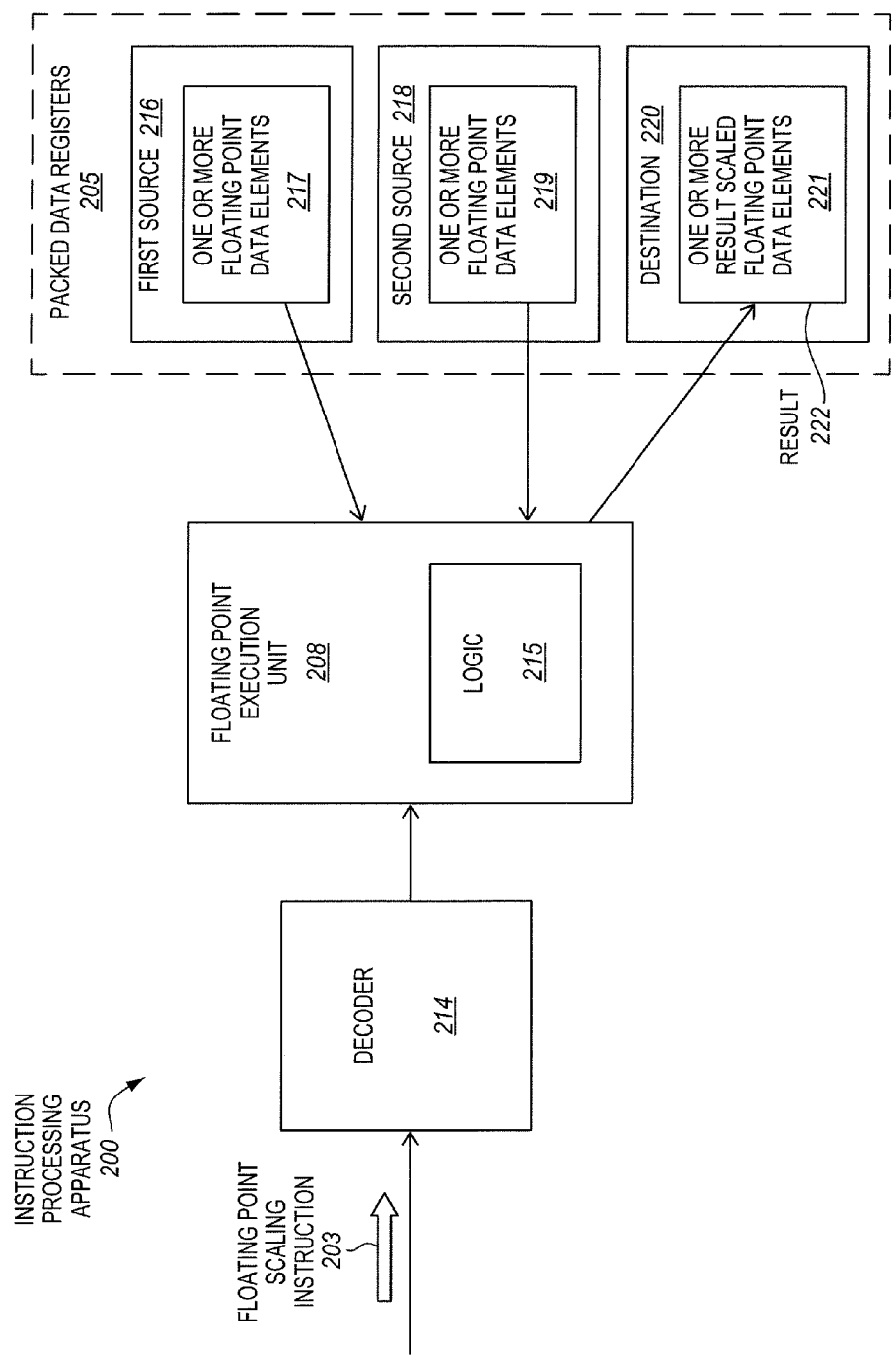
FIG. 2 is a block diagram of an embodiment of an instruction processing apparatus having a floating point execution unit that is operable to execute an embodiment of a floating point scaling instruction.

FIG. 2 is a block diagram of an embodiment of an instruction processing apparatus 200 having a floating point execution unit 208 that is operable to execute instructions including an embodiment of a floating point scaling instruction 203. In some embodiments, the instruction processing apparatus may be a processor and/or may be included in a processor. For example, in some embodiments, the instruction processing apparatus may be, or may be included in, the processor 100 of FIG. 1, or one similar. Alternatively, the instruction processing apparatus may be included in a different processor, or electronic system. In some embodiments, the instruction processing apparatus may be included in an add-on or separate floating point processor or unit to introduce or supplement floating point processing capability of an associated processor.

The instruction processing apparatus 200 may receive the floating point scaling instruction 203. For example, the instruction may be received from an instruction fetch unit, an instruction queue, or a memory. The floating point scaling instruction may represent a machine instruction, macroinstruction, or control signal that is recognized by the instruction processing apparatus and that controls the apparatus to perform a particular operation.

The floating point scaling instruction may explicitly specify (e.g., through bits or one or more fields) or otherwise indicate (e.g., implicitly indicate) a first source 216, may specify or otherwise indicate a second source 218, and may specify or otherwise indicate a destination (e.g., a destination storage location) 220 where a result 222 is to be stored in accordance with the instruction. The first source includes one or more floating point data elements 217, the second source includes one or more corresponding floating point data elements 219. The corresponding data elements may correspond in same relative positions within the sources.

A floating point number includes a sign, significand, base, and exponent, which are related as shown in Equation 1:

$$A = (-1)^{sign} * \text{significand} * \text{base}^{exponent} \qquad \text{Equation 1}$$

The expression "$(-1)^{sign}$" represents negative one raised to the power of the sign. This expression evaluates whether the floating point number is positive (+) or negative (−). For example, when the sign is integer zero the floating point number is positive, or alternatively when the sign is integer one the floating point number is negative. The significand includes a digit string of a length that largely determines the precision of the floating point number. The significand is also sometimes referred to as the significant digits, the coefficient, the fraction, or the mantissa. The radix point (e.g., the decimal point for decimal format) is commonly implicitly assumed to reside at a fixed position (e.g., just to the right of the leftmost or most significant digit). The expression "$\text{base}^{exponent}$" represents the base raised to the power of the exponent. This may also be stated as the base raised to the exponent power, the base raised to the exponent, or simply as the base to the exponent. The base is commonly base 2 (for binary), base 10 (for decimal), or base 16 (for hexadecimal). The base is sometimes referred to as the radix. The exponent is also referred to as a characteristic or scale. Raising the base to the power of the exponent in effect shifts the radix point (e.g., from the implicit or assumed starting position) by the exponent number of digits. The radix point is shifted to the right if the exponent is positive, or to the left if the exponent is negative.

Referring again to FIG. 2, in some embodiments, the first source 216, the second source 218, and the destination 220, may each be within a set of packed data registers 205 of the instruction processing apparatus, although this is not required. The packed data registers may each represent an on-die storage location (e.g., on die with the execution unit). The packed data registers may represent architectural registers. Each of the packed data registers may be operable to store packed or vector floating point data. In some embodiments, the packed data registers may also be operable to store scalar floating point data. The packed data registers may be implemented in different ways in different microarchitectures using well-known techniques, and are not limited to any particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof. Alternatively, in other embodiments, one or more of the first source, the second source, the destination, or some combination thereof, may be stored in other storage locations besides the packed data registers (e.g., in scalar floating point registers, memory locations, etc.).

The illustrated instruction processing apparatus includes an instruction decode unit or decoder 214. The decoder may receive and decode higher-level machine instructions or macroinstructions, and output one or more lower-level micro-operations, micro-code entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

In other embodiments, instead of having the decoder 214, an instruction emulator, translator, morpher, interpreter, or other instruction conversion logic may be used. Various different types of instruction conversion logic are known in the arts and may be implemented in software, hardware, firmware, or a combination thereof. The instruction conversion logic may receive the instruction, emulate, translate, morph, interpret, or otherwise convert the received instruction into one or more corresponding derived instructions or control signals. In still other embodiments, both instruction conversion logic and a decoder may be used. For example, the apparatus may have instruction conversion logic to convert the received instruction into one or more intermediate instructions, and a decoder to decode the one or more intermediate instructions into one or more lower-level instructions or control signals executable by native hardware of the instruction processing apparatus. Some or all of the instruction conversion logic may be located off-die from the rest of the instruction processing apparatus, such as on a separate die or in an off-die memory.

Referring again to FIG. 2, the floating point execution unit 208 is coupled with the decoder 214. The execution unit may receive from the decoder one or more micro-operations, micro-code entry points, microinstructions, other instructions, or other control signals, which reflect, or are derived from, the floating point scaling instruction. The execution unit is also coupled with the first source 216, the second source 218, and the destination 220. The floating point execution unit includes logic (e.g., typically at least some circuitry) designed to carry out operations (e.g., arithmetic operations, scaling operations, etc.) on floating point numbers.

The floating point execution unit 208 is operable, in response to and/or as a result of the floating point scaling instruction 203, which specifies or otherwise indicates the first source 216 including the one or more floating point data elements 217, specifies or otherwise indicates the second source 218 including the one or more corresponding floating point data elements 219, and specifies or otherwise indicates the destination 220, to store a result 222 in the destination. The result includes one or more corresponding result scaled floating point data elements. In some embodiments, each of the one or more result scaled floating point data elements includes a corresponding floating point data element of the second source multiplied by a base raised to a power of an integer representative of the corresponding floating point data element of the first source. The base is the same base as the one or more floating point data elements of the first source (e.g., commonly base 2 but may also be base 10, base 16, etc.).

The floating point execution unit and/or the instruction processing apparatus may include specific or particular logic (e.g., typically circuitry or other hardware potentially combined with software and/or firmware) operable to execute and/or process the floating point scaling instruction, and store the result in response to the instruction (e.g., in response to one or more microinstructions or other control signals derived from the instruction). In some embodiments, the floating point execution unit may include integrated circuitry, digital circuits, application specific integrated circuits, analog circuits, programmed logic devices, storage devices including instructions, or a combination thereof. In some embodiments, the floating point execution unit may include at least some circuitry or hardware (e.g., specific circuits configured from transistors, gates, and/or other integrated circuitry components).

To avoid obscuring the description, a relatively simple instruction processing apparatus has been shown and described. In other embodiments, the instruction processing apparatus may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. Embodiments may have multiple cores, logical processors, or execution engines. An execution unit operable to execute an embodiment of an instruction disclosed herein may be included in at least one, at least two, most, or all of the cores, logical processors, or execution engines. There are literally numerous different combinations and configurations of components in processors, and embodiments are not limited to any particular combination or configuration.

Figure 3:
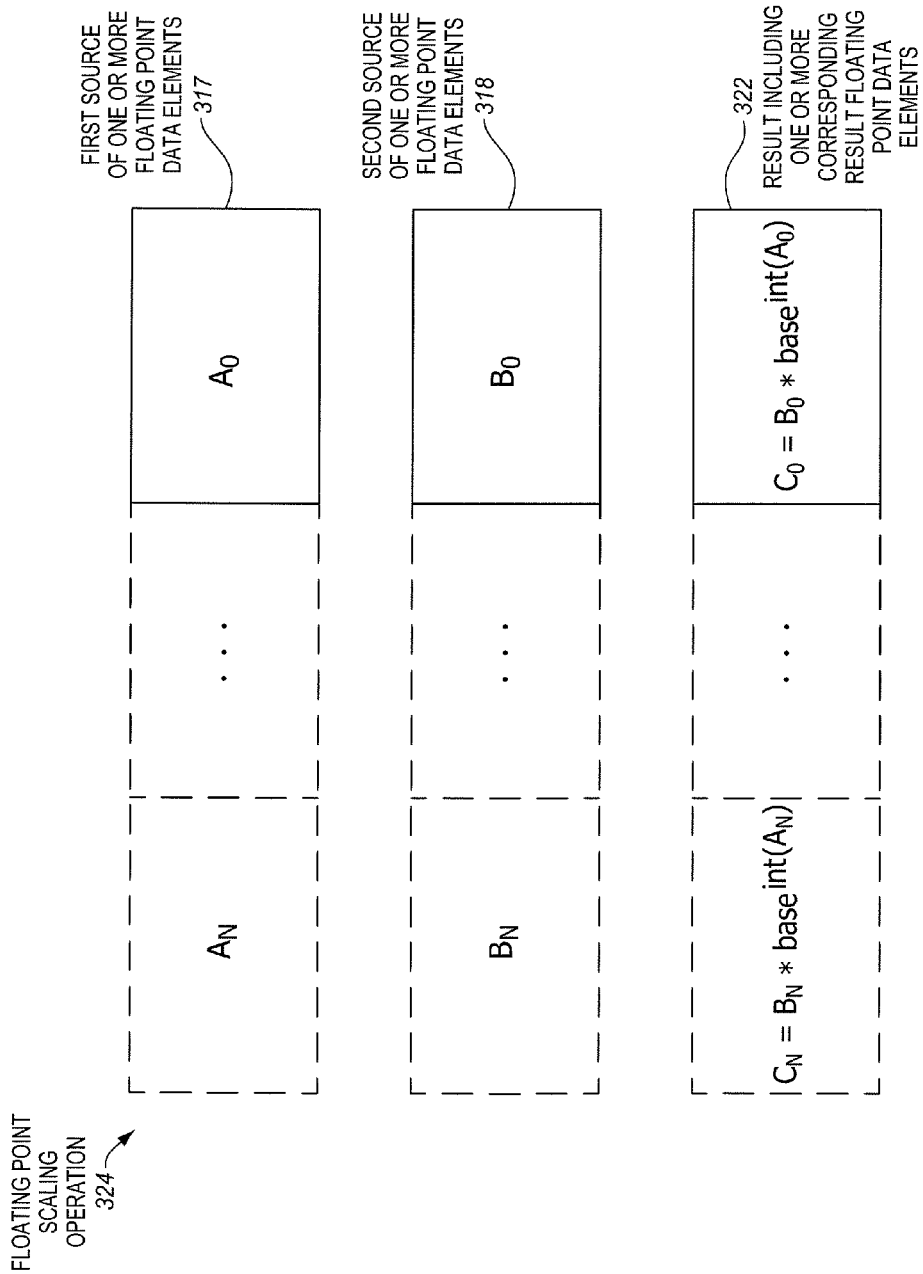
FIG. 3 is a block diagram illustrating an embodiment of a floating point scaling operation that may be performed in response to an embodiment of a floating point scaling instruction.

FIG. 3 is a block diagram illustrating an embodiment of a floating point scaling operation 324 that may be performed in response to an embodiment of a floating point scaling instruction. The instruction specifies or otherwise indicates a first source 317 including one or more floating point data elements, and a second source 318 including one or more corresponding floating point data elements. In some embodiments, the first source includes a single scalar floating point data element $A_0$, and the second source includes a single scalar floating point data element $B_0$. In other embodiments, the first source includes a plurality of N packed floating point data elements $A_0$-$A_N$, and the second source includes a corresponding plurality of N packed floating point data elements $B_0$-$B_N$, where N is two or more. Commonly, the number N of the packed floating point data elements may be equal to the size in bits of the packed data divided by the size in bits of the floating point data elements.

The floating point scaling instruction also specifies or otherwise indicates a destination (e.g., a destination storage location). A result 322 including one or more corresponding result floating point data elements may be generated and stored in the destination in response to the floating point scaling instruction. In some embodiments, each of the one or more result floating point data elements ($C_i$) may represent a scaled floating point result data element that includes a corresponding floating point data element of the second source ($B_i$) multiplied by a base raised to a power of an integer representative of the corresponding floating point data element ($A_i$) of the first source (int($A_0$)), according to the equation:

$$C_i = B_i * base^{int(A_i)} \qquad \text{Equation 2}$$

The base may be the base of the floating point data elements of the first and/or second sources (e.g., commonly base 2 but alternatively base 10 or base 16).

In some embodiments, the floating point scaling instruction/operation may permit the first source to have non-integer floating point values. This may help to avoid one or more preceding instructions to generate the integer values as input to the floating point scaling instruction/operation (e.g., to perform bit level extraction, etc.). In some embodiments, the floating point scaling instruction/operation may be operative to calculate or determine the one or more integers that are representative of the one or more corresponding floating point data elements of the first source (e.g., representative of their magnitudes) within the confines of the execution of the single floating point scaling instruction/operation. In some embodiments, each integer may be the maximum integer that is less than or equal to the corresponding floating point data element of the first source (e.g., the floor). In other embodiments, each integer may be the minimum integer that is greater than or equal to the corresponding floating point data element of the first source (e.g., the ceiling). Other integers representative of the magnitudes of the corresponding floating point data elements may also be used based on other conversion conventions.

In some embodiments, the floating point scaling instruction/operation may permit the first and/or second sources to include floating point data elements having special values defined for floating point numbers (e.g., a positive infinity, a negative infinity, a Not a Number (NaN), a denormal number, etc.). In such embodiments, the instruction/operation may complete execution and store the result without generating an interrupt, trap, or other exception (e.g., an underflow or overflow exception). By way of example, the first source may include a floating point data element that is one of a Not a Number (NaN), a positive infinity, a negative infinity, and a denormal number, and a result may be stored without generating an exception. As another example, the first source may include a floating point data element that is a Not a Number (NaN), execution may complete without an exception, and the corresponding result floating point data element in the result may be a NaN. As yet another example, the second source may include a floating point data element that is positive infinity, the first source may include a corresponding floating point data element that is a Not a Number (NaN), execution may complete without an exception, and the corresponding result floating point data element may be a Not a Number (NaN). Advantageously, the ability of the instruction to handle extreme conditions without exceptions and without needing a series of instructions to check for extreme conditions and handle them when they occur may tend to increase computational efficiency.

Moreover, even when the inputs are not special, the result may be special (e.g., may overflow or may underflow when the result does not fit within the floating-point format). In such cases, the instruction may be operable to properly handle these special cases, for example in some embodiments in accordance with IEEE standard specifications. When such special conditions occur, execution of the instruction may complete without an interrupt or exception. That is, the instruction is operable to properly handle special inputs and/or special outputs. Advantageously, exceptions and interrupts may be avoided and also additional processing to cover such special cases with separate instruction sequences is not necessary.

FIGS. 4A-E are block diagrams illustrating example embodiments of suitable floating point formats. The Institute of Electrical and Electronics Engineers (IEEE) has standardized these formats in various versions of the standard IEEE 754.

Figure 4A:
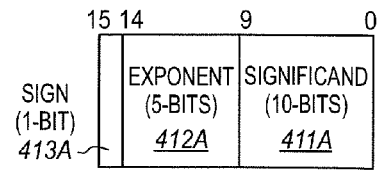
FIGS. 4A-E are block diagrams illustrating example embodiments of suitable floating point formats.

FIG. 4A illustrates a half precision floating point format 410A. The half precision floating point format has 16-bits and is also referred to as binary16. The half precision floating point format includes a 10-bit significand 411A in bits [9:0], a 5-bit exponent 412A in bits [14:10], and a 1-bit sign 413A in bit [15].

Figure 4B:
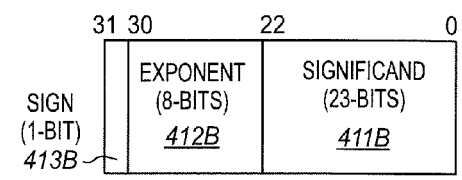

FIG. 4B illustrates a single precision floating point format 410B. The single precision floating point format has 32-bits and is also referred to as binary32. The single precision floating point format includes a 23-bit significand 411B in bits [22:0], an 8-bit exponent 412B in bits [30:23], and a 1-bit sign 413B in bit [31].

Figure 4C:
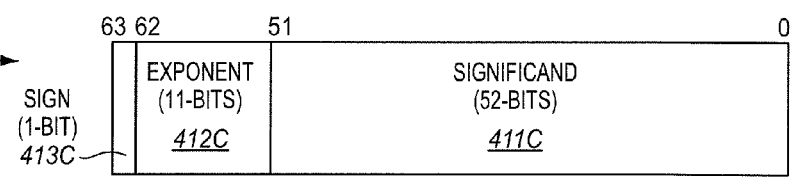

FIG. 4C illustrates a double precision floating point format 410C. The double precision floating point format has 64-bits and is also referred to as binary64. The double precision floating point format includes a 52-bit significand 411C in bits [51:0], an 11-bit exponent 412C in bits [62:52], and a 1-bit sign 413C in bit [63]. Currently, single precision and double precision formats are perhaps the most widely used by the majority of processors, computer systems, and electronic devices.

Figure 4D:
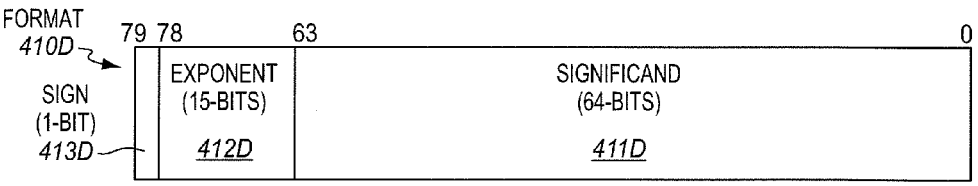

FIG. 4D illustrates an extended double precision floating point format 410D. The extended double precision floating point format has 80-bits. The extended double precision floating point format includes a 64-bit significand 411D in bits [63:0], a 15-bit exponent 412D in bits [78:64], and a 1-bit sign 413D in bit [79].

Figure 4E:
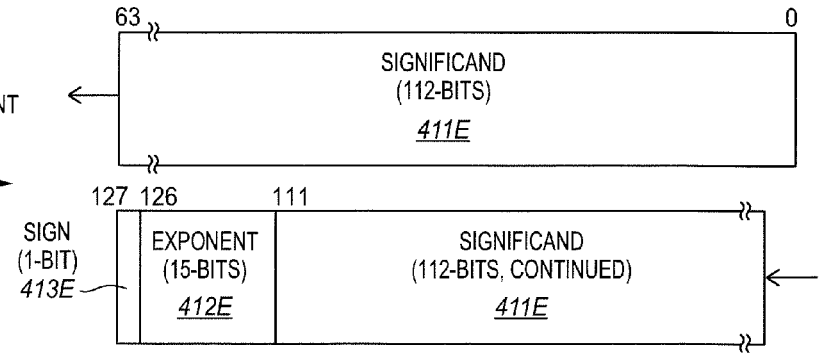

FIG. 4E illustrates a quadruple precision floating point format 410E. The quadruple precision floating point format has 128-bits and is also referred to as binary128. The quadruple precision floating point format includes a 112-bit significand 411E in bits [111:0], a 15-bit exponent 412E in bits [126:112], and a 1-bit sign 413E in bit [127].

In each of these floating point formats, the base is implicit or assumed to be base 2 (i.e., binary) and is not stored separately in the floating point formats. The most significant or leftmost bit of the significands is known as the J-bit. The J-bit is implicitly assumed to be binary 1, and is generally not stored in the floating point formats but rather is an implicit or hidden bit that provides additional precision (e.g., a single precision floating point number which explicitly has 23-bits for the significand actually has 24-bits of precision) without needing to be stored. The radix point is generally presumed to follow the J-bit. The exponents generally have an exponent bias. For example, the half precision format may have an exponent bias of 15, the single precision format may have an exponent bias of 127, the double precision format may have an exponent bias of 1023, and the quadruple precision format may have an exponent bias of 16383. Further details on floating point numbers and formats, if desired, are available in IEEE 754.

These are just a few illustrative examples. Other suitable formats include, but are not limited to, decimal32, decimal64, and decimal128. Moreover, other formats developed in the future will also generally be suitable.

Figure 5:
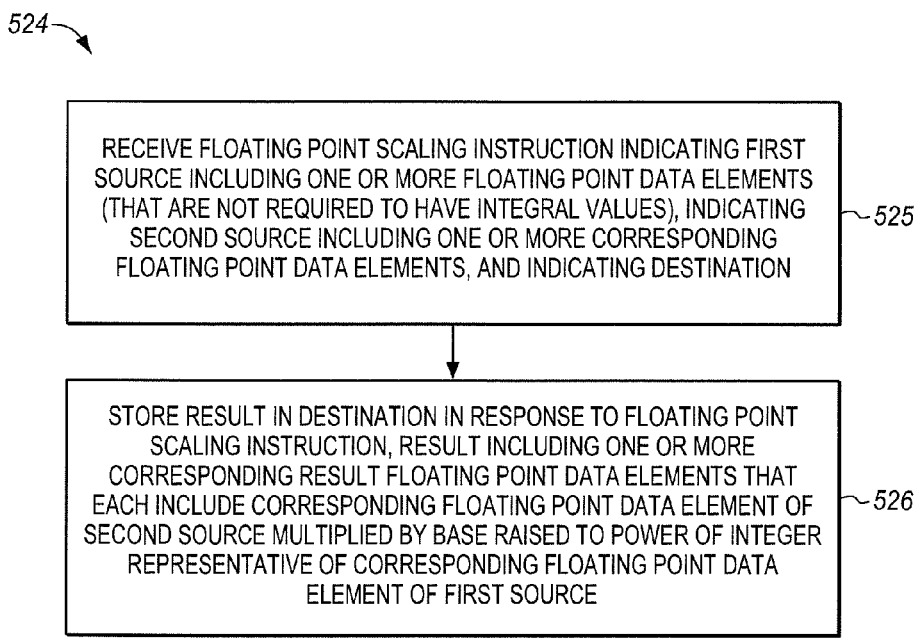
FIG. 5 is a block flow diagram of an embodiment of a method of processing an embodiment of a floating point scaling instruction.

FIG. 5 is a block flow diagram of an embodiment of a method 524 of processing an embodiment of a floating point scaling instruction. In various embodiments, the method may be performed by a general-purpose processor, a special-purpose processor (e.g., a graphics processor or a digital signal processor), or another type of digital logic device or instruction processing apparatus. In some embodiments, the method 524 may be performed by the processor 100 of FIG. 1, or the instruction processing apparatus 200 of FIG. 2. Alternatively, the method 524 may be performed by different embodiments of processors or instruction processing apparatus. Moreover, the processor 100 of FIG. 1, and the instruction processing apparatus 200 of FIG. 2, may perform embodiments of operations and methods either same as, similar to, or different than those of the method 524 of FIG. 5.

The method includes receiving the floating point scaling instruction, at block 525. The floating point scaling instruction specifies or otherwise indicates a first source including one or more floating point data elements, specifies or otherwise indicates a second source including one or more corresponding floating point data elements, and specifies or otherwise indicates a destination (e.g., a destination storage location). In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache).

Then, a result is stored in the destination in response to, as a result of, and/or as specified by the floating point scaling instruction, at block 526. The result includes one or more corresponding result floating point data elements. Each of the one or more result floating point data elements includes a corresponding floating point data element of the second source multiplied by a base (e.g., of the one or more floating point data elements of the first source) raised to a power of an integer representative of the corresponding floating point data element of the first source. By way of example, a floating point execution unit, instruction processing apparatus, or processor including at least some circuitry may perform the operation specified by the instruction and store the result.

The illustrated method includes operations that are visible from outside a processor or instruction processing apparatus (e.g., visible from a software perspective). In other embodiments, the method may optionally include one or more operations occurring internally within the processor. By way of example, the floating point scaling instruction may be fetched, and then decoded, translated, emulated, or otherwise converted, into one or more other instructions or control signals. The source operands/data may be accessed and/or received. A floating point execution unit may be enabled to perform the operation specified by the instruction, and may perform the operation (e.g., microarchitectural operations to implement the operations of the instructions may be performed).

Figure 6C:
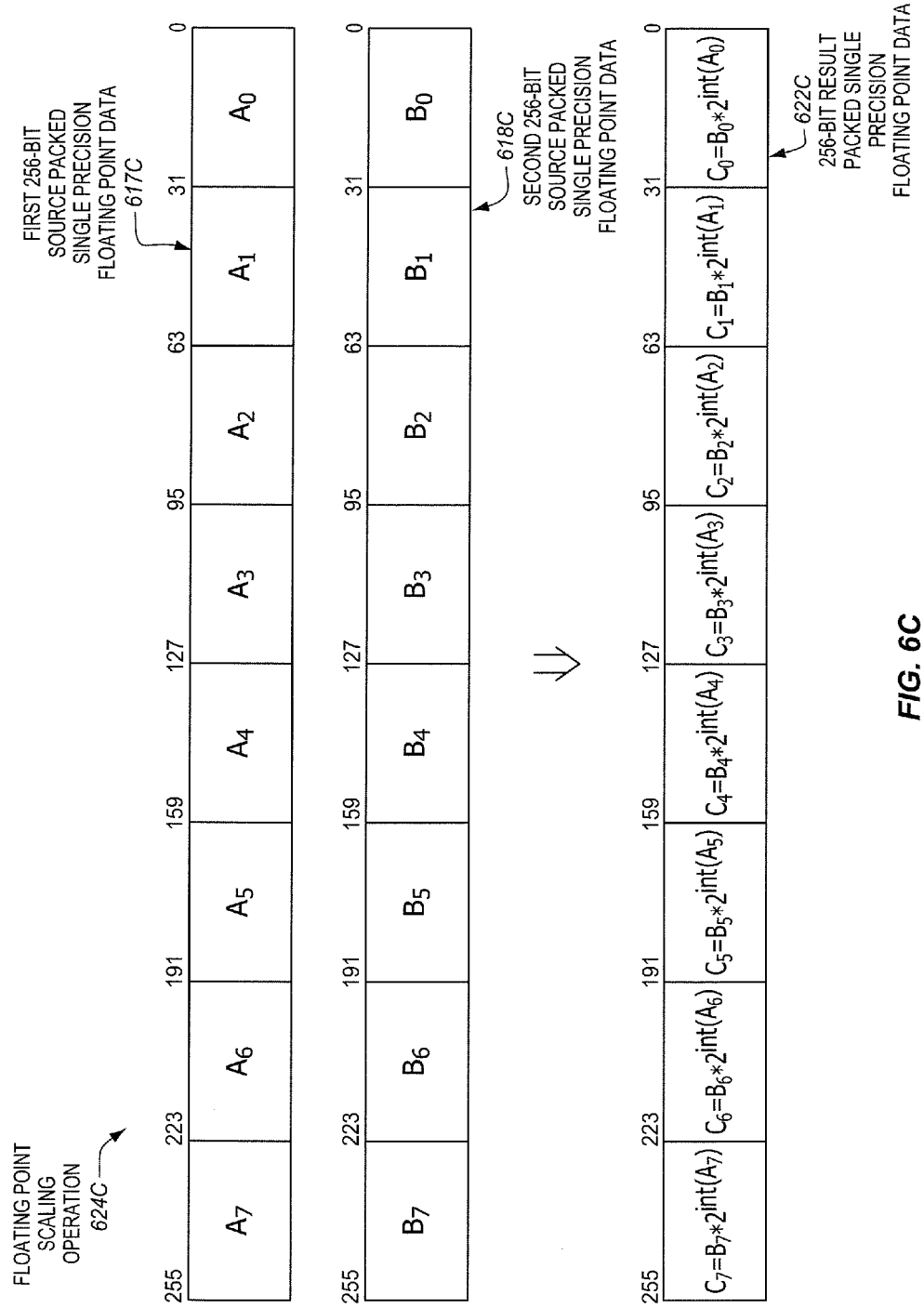

FIG. 6A-C are block diagrams illustrating embodiments of floating point scaling operations that may be performed on packed 32-bit single precision floating point data in response to embodiments of floating point scaling instructions.

FIG. 6A illustrates a first embodiment of a floating point scaling operation 624A that may be performed on a first 64-bit source packed data 617A that includes two packed 32-bit single precision floating point data elements $A_0$-$A_1$, and a second 64-bit source packed data 618A that includes two corresponding packed 32-bit single precision floating point data elements $B_0$-$B_1$, to generate and store a 64-bit result 622A that includes two corresponding packed 32-bit single precision result floating point data elements $C_0$-$C_1$.

FIG. 6B illustrates a second embodiment of a floating point scaling operation 624B that may be performed on a first 128-bit source packed data 617B that includes four packed 32-bit single precision floating point data elements $A_0$-$A_3$, and a second 128-bit source packed data 618B that includes four corresponding packed 32-bit single precision floating point data elements $B_0$-$B_3$, to generate and store a 128-bit result 622B that includes four corresponding packed 32-bit single precision result floating point data elements $C_0$-$C_3$.

FIG. 6C illustrates a third embodiment of a floating point scaling operation 624C that may be performed on a first 256-bit source packed data 617C that includes eight packed 32-bit single precision floating point data elements $A_0$-$A_7$, and a second 256-bit source packed data 618C that includes eight corresponding packed 32-bit single precision floating point data elements $B_0$-$B_7$, to generate and store a 256-bit result 622C that includes eight corresponding packed 32-bit single precision result floating point data elements $C_0$-$C_7$.

In each of FIGS. 6A-C, each of the 32-bit single precision result floating point data elements ($C_i$) includes the corresponding 32-bit single precision floating point data element of the second source ($B_i$) multiplied by base two (2) raised to a power of an integer representative of the corresponding 32-bit single precision floating point data element of the first source (int($A_i$)).

Figure 7A:
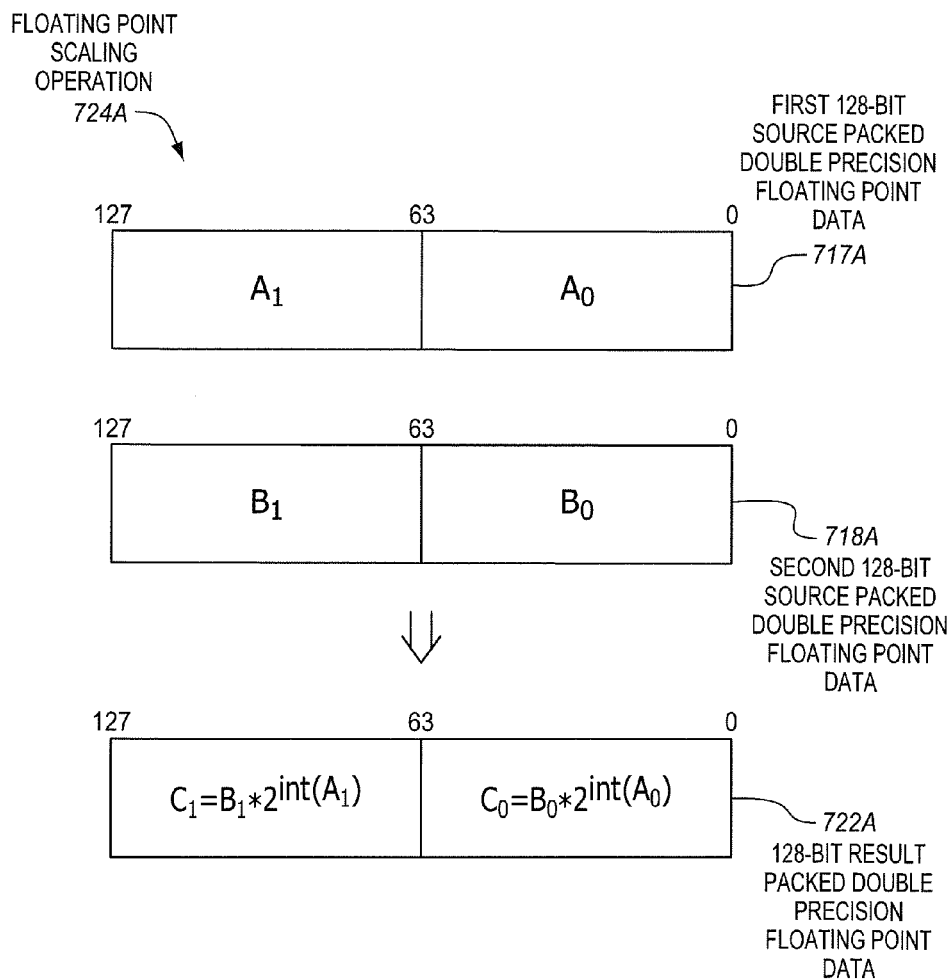
FIG. 7A-B are block diagrams illustrating embodiments of floating point scaling operations that may be performed on packed 64-bit double precision floating point data.
Figure 7B:
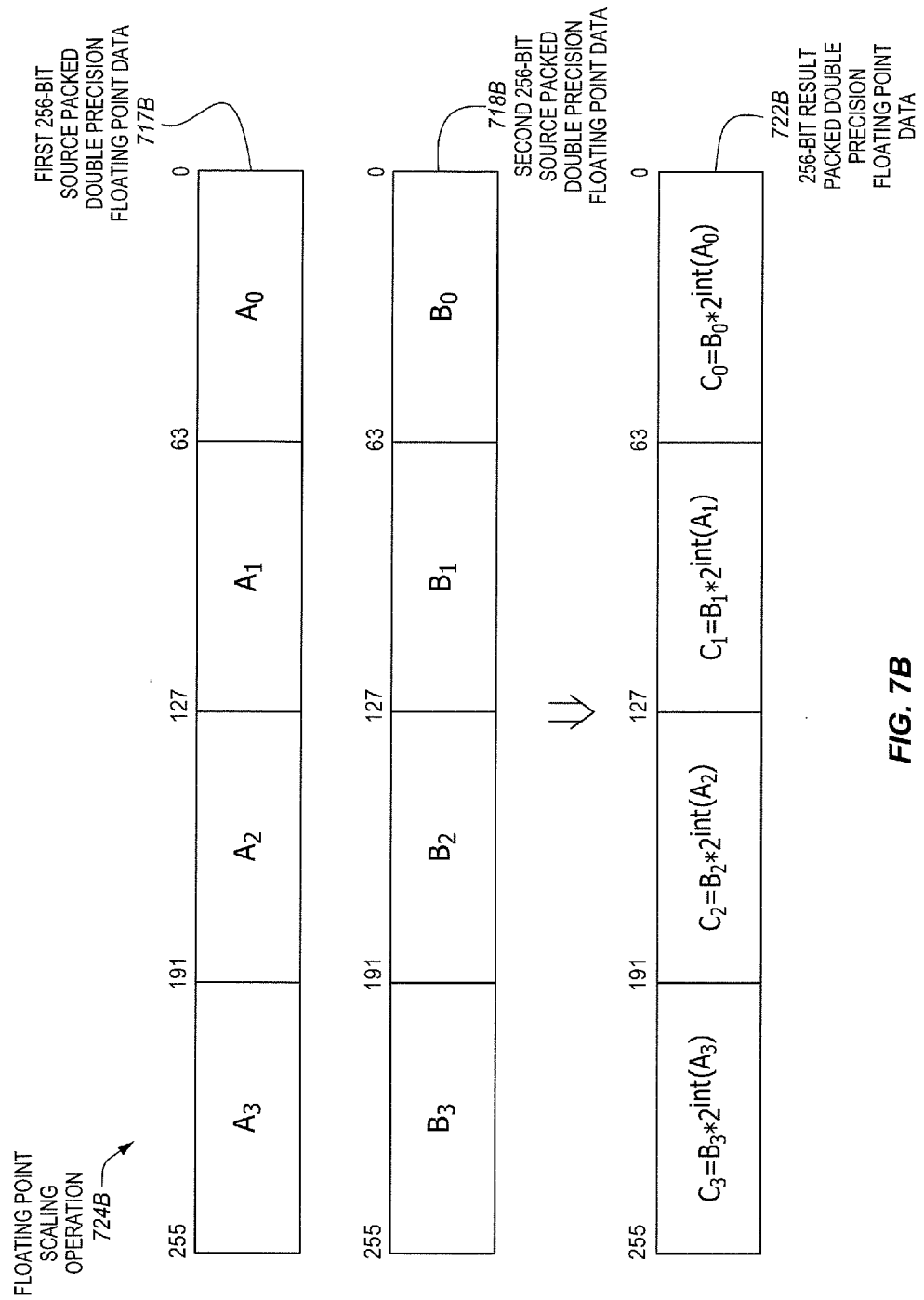

FIG. 7A-B are block diagrams illustrating embodiments of floating point scaling operations that may be performed on packed 64-bit double precision floating point data in response to embodiments of floating point scaling instructions.

FIG. 7A illustrates a first embodiment of a floating point scaling operation 724A that may be performed on a first 128-bit source packed data 717A that includes two packed 64-bit double precision floating point data elements $A_0$-$A_1$, and a second 128-bit source packed data 718A that includes two corresponding packed 64-bit double precision floating point data elements $B_0$-$B_1$, to generate and store a 128-bit result 722A that includes two corresponding packed 64-bit double precision result floating point data elements $C_0$-$C_1$.

FIG. 7B illustrates a second embodiment of a floating point scaling operation 724B that may be performed on a first 256-bit source packed data 717B that includes four packed 64-bit double precision floating point data elements $A_0$-$A_3$, and a second 256-bit source packed data 718B that includes four corresponding packed 64-bit double precision floating point data elements $B_0$-$B_3$, to generate and store a 256-bit result 722B that includes four corresponding packed 64-bit double precision result floating point data elements $C_0$-$C_3$.

In each of FIGS. 7A-B, each of the 64-bit double precision result floating point data elements ($C_i$) includes the corresponding 64-bit double precision floating point data element of the second source ($B_i$) multiplied by base two (2) raised to a power of an integer representative of the corresponding 64-bit double precision floating point data element of the first source (int($A_i$)).

FIG. 8 is a block diagram illustrating an embodiment of a floating point scaling operation 824 that may be performed on scalar 32-bit single precision floating point data in response to an embodiment of a floating point scaling instruction. The operation is performed on a first source 817 of a scalar 32-bit single precision floating point data element A, and a second source 818 of a scalar 32-bit single precision floating point data element B. A result 822 stored in response to the operation and/or instruction includes a corresponding scalar 32-bit single precision result floating point data element C. The scalar 32-bit single precision result floating point data element C includes the corresponding 32-bit single precision floating point data element of the second source (B) multiplied by base two (2) raised to a power of an integer representative of the corresponding 32-bit single precision floating point data element of the first source (int(A)).

FIG. 9 is a block diagram illustrating an embodiment of a floating point scaling operation 924 that may be performed on scalar 64-bit double precision floating point data in response to an embodiment of a floating point scaling instruction. The operation is performed on a first source 917 of a scalar 64-bit double precision floating point data element A, and a second source 918 of a scalar 64-bit double precision floating point data element B. A result 922 stored in response to the operation and/or instruction includes a corresponding scalar 64-bit double precision result floating point data element C. The scalar 64-bit double precision result floating point data element C includes the corresponding 64-bit double precision floating point data element of the second source (B) multiplied by base two (2) raised to a power of an integer representative of the corresponding 64-bit double precision floating point data element of the first source (int(A)).

As shown in FIGS. 8-9, in some embodiments, the first source may be stored in a first packed data storage location (e.g., a packed data register), the second source may be stored in a second packed data storage location, and the result may be stored in a third packed data storage location, although this is not required. Alternatively, one or more of these may alternatively be stored in a non-packed register or memory location.

These are just a few illustrative embodiments of floating point scaling operations. Operations on single precision and double precision floating point data have been shown due to the widespread use of these formats. However, in other embodiments floating point scaling operations may operate on other floating point formats (e.g., half precision, quadruple precision, extended double precision, etc.). In the illustrations, the floating point formats of both sources are the same, although in other embodiments the floating point formats of the sources may be different (e.g., mixed-format scaling operations may be performed). For simplicity of illustration, packed data having a width of 256-bits or less has been shown. However, in other embodiments floating point scaling operations may operate on packed data having widths of 512-bits or wider (e.g., including at least sixteen 32-bit single precision floating point data elements or at least eight 64-bit double precision floating point data elements). Moreover, floating point scaling operations using base 2 have been shown, due to the current widespread use of base 2. However, in other embodiments floating point scaling operations may use other bases (e.g., base 10, base 16, etc.).

Figure 10:
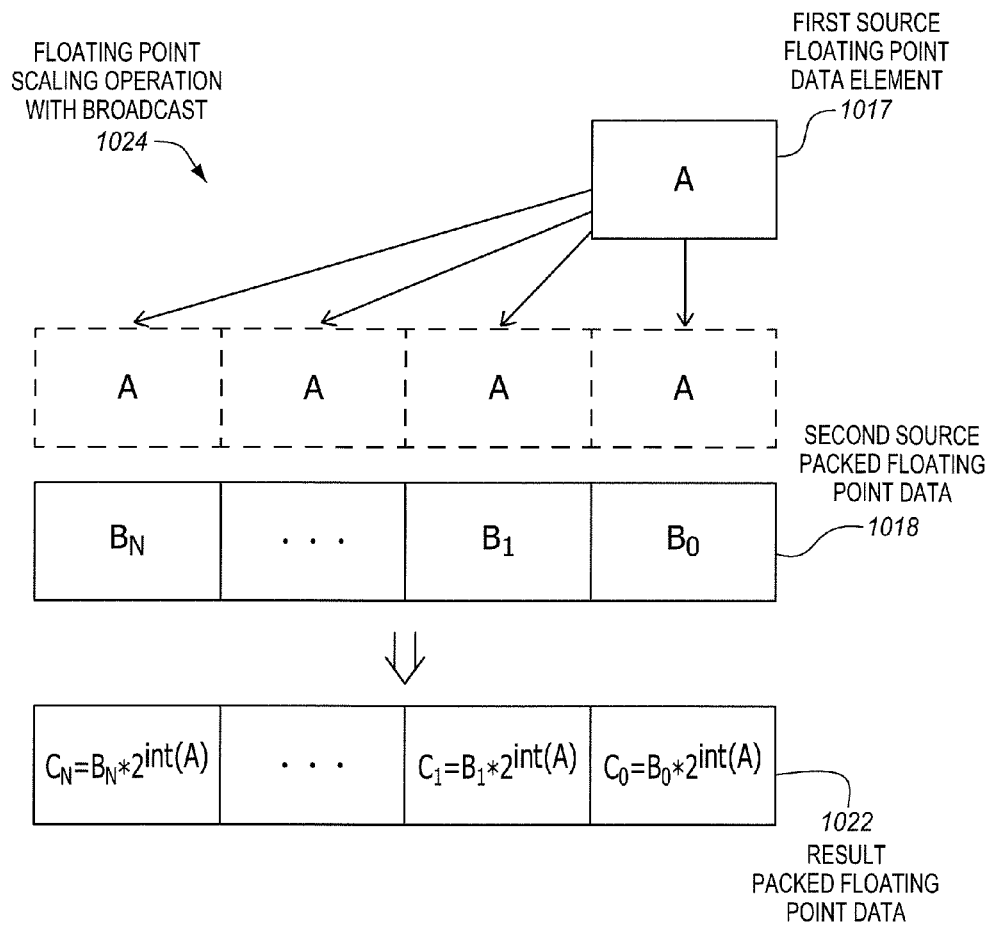
FIG. 10 is a block diagram illustrating an embodiment of a floating point scaling operation with data element broadcast.

FIG. 10 is a block diagram illustrating an embodiment of a floating point scaling operation with data element broadcast 1024 that may be performed in response to an embodiment of a floating point scaling instruction with data element broadcast. Data element broadcast is useful in algorithms where it is desired to reuse a single source data element for each of multiple vector operations. The instruction may indicate a first source 1017 having a single floating point data element A which is to be broadcast, a second source 1018 having a plurality of packed floating point data elements $B_0$-$B_N$ where N is at least two, and a destination.

The floating point scaling instruction with data element broadcast may combine an initial data element broadcast of the single floating point data element A of the first source with a subsequent floating point scaling operation. The initial data element broadcast may broadcast or replicate the single floating point data element A multiple times (e.g., a number of times equal to the number N of floating point data elements of the second source). The replicated values of the floating point data element A may represent a vector or packed data that is to be used in the subsequent floating point scaling operation along with the plurality of floating point data elements $B_0$-$B_N$ in the second source. In some embodiments, the single floating point data element A may reside in memory and the data element broadcast may be implemented through a load operation (e.g., a load micro-op) derived from the floating point scaling instruction with broadcast. The broadcast of the single data element may represent a pre-processing data transformation prior to performing the floating point scaling operation.

A result packed floating point data 1022 may be stored in the destination in response to the floating point scaling with broadcast operation and/or instruction. The result may include a plurality of packed floating point data elements $C_0$-$C_N$ that each correspond to a respective one of the plurality of packed floating point data elements $B_0$-$B_N$ of the second source. Each of the plurality of packed result floating point data elements ($C_i$) may include the corresponding floating point data element of the second source ($B_i$) multiplied by a base (e.g., base 2) raised to a power of an integer representative of the corresponding single floating point data element of the first source (int(A)). Notice that the single floating point data element of the first source is used for each of the result data elements.

Other embodiments pertain to masked floating point scaling instructions and/or operations. The masked floating point scaling instructions may specify or otherwise indicate packed data operation masks. The packed data operation masks may also be referred to herein simply as masks. Each mask may represent a predicate operand or conditional control operand that may mask, predicate, or conditionally control whether or not floating point scaling operations associated with the instruction are to be performed and/or whether or not results of the floating point scaling operations are to be stored. In some embodiments, each mask may be operable to mask the floating point scaling operations at per-data element granularity. Each mask may allow the floating point scaling operations for different result data elements to be predicated or conditionally controlled separately and/or independently of the other result data elements.

The masks may each include multiple mask elements, predicate elements, conditional control elements, or flags. The elements or flags may be included in a one-to-one correspondence with result data elements (e.g., if there are four result data elements there may be four elements or flags). Each element or flag may be operable to mask a separate packed data operation and/or storage of a floating point scaling result in the corresponding result data element. Commonly each element or flag may be a single bit. The single bit may allow specifying either of two different possibilities (e.g., perform the operation versus do not perform the operation, store a result of the operation versus do not store a result of the operation, etc.).

A binary value of each bit of the mask may predicate or control whether or not a floating point scaling operation associated with the masked floating point scaling instruction is to be performed and/or whether or not a result of the floating point scaling operation is to be stored. According to one possible convention, each bit may be set (i.e., have a binary value of 1) or cleared (i.e., have a binary value of 0), respectively, to allow or not allow a result of a floating point scaling operation, performed on data elements of the first and second sources indicated by the masked floating point scaling instruction, to be stored in a corresponding result data element.

In some embodiments, merging-masking may be performed. In merging-masking, when an operation is masked out, a value of a corresponding data element from a source packed data may be stored in the corresponding result data element. For example, if a source is to be reused as the destination, then the corresponding destination data element may retain its initial source value (i.e., not be updated with a calculation result). In other embodiments, zeroing-masking may be performed. In zeroing-masking, when an operation is masked out, the corresponding result data element may be zeroed out or a value of zero may be stored in the corresponding result data element. Alternatively, other predetermined values may be stored in the masked out result data elements.

In some embodiments, the floating point scaling operation may optionally be performed on all corresponding pairs of data elements of the first and second source data regardless of the corresponding bits of the mask, but the results may or may not be stored in the result packed data depending upon the corresponding bits of the mask. Alternatively, in another embodiment, the floating point scaling operations may optionally be omitted (i.e., not performed) if the corresponding bits of the mask specify that the results of the operations are not to be stored in the packed data result. In some embodiments, exceptions and/or violations may optionally be suppressed for, or not raised by, an operation on a masked-off element. In some embodiments, for masked floating point scaling instructions with a memory operand, memory faults may optionally be suppressed for masked-off data elements.

Figure 11:
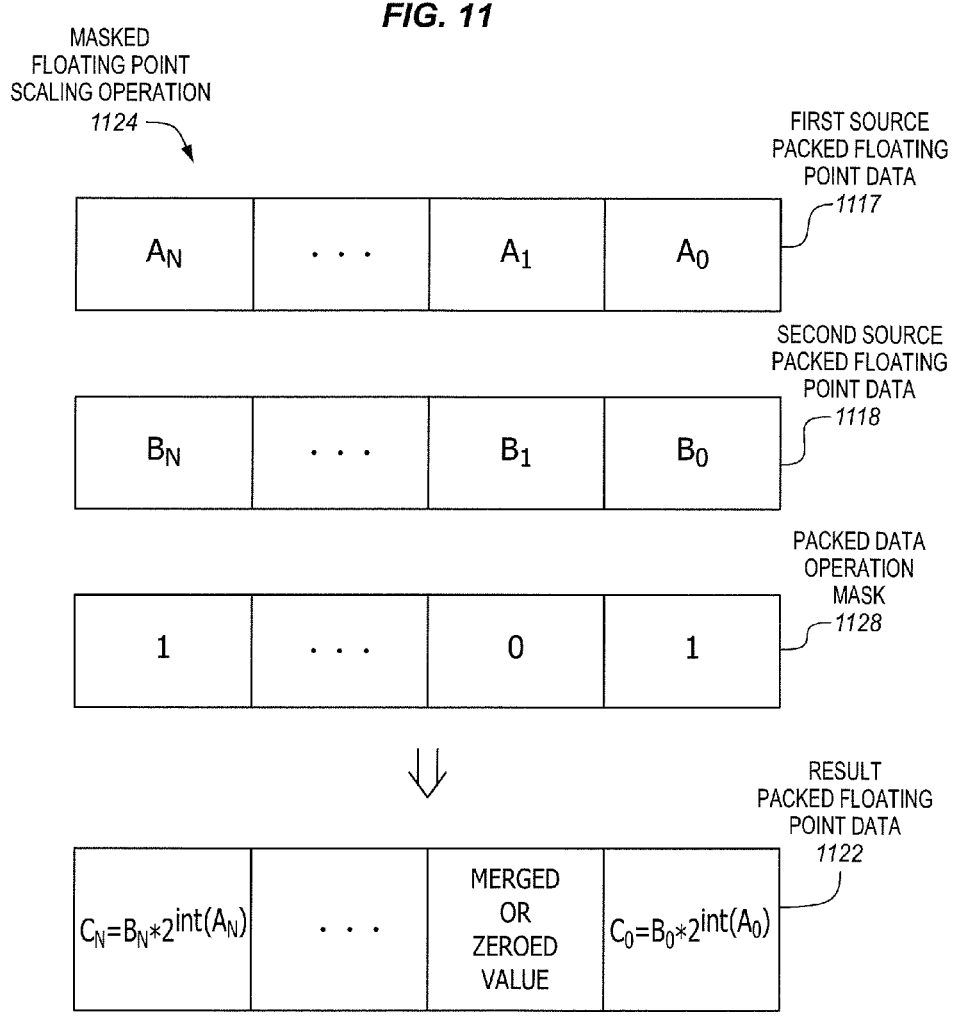
FIG. 11 is a block diagram illustrating an embodiment of a masked floating point scaling operation.

FIG. 11 is a block diagram illustrating an embodiment of a masked floating point scaling operation 1124 that may be performed in response to an embodiment of a masked floating point scaling instruction. The instruction specifies or otherwise indicates a first source 1117 including packed floating point data elements $A_0$-$A_N$, a second source 1118 including packed floating point data elements $B_0$-$B_N$, a packed data operation mask 1128, and a destination (e.g., a destination storage location). By way of example, in the case of 512-bit wide packed data and 32-bit single precision floating point data elements the mask may include sixteen 1-bit mask bits, or in the case of 64-bit double precision floating point data elements the mask may include eight 1-bit mask bits.

A result packed floating point data 1122 including a plurality of result floating point data elements is stored in the destination in response to the instruction. When the result floating point data elements are not masked out by the packed data operation mask (e.g., in the illustration when the corresponding mask bit is set to 1), a result of the floating point scaling operation is stored. Alternatively, when the floating point data elements are masked out by the packed data operation mask (e.g., in the illustration when the corresponding mask bit is cleared to 0), some other value such as a zeroed or merged value is stored.

Figure 12:
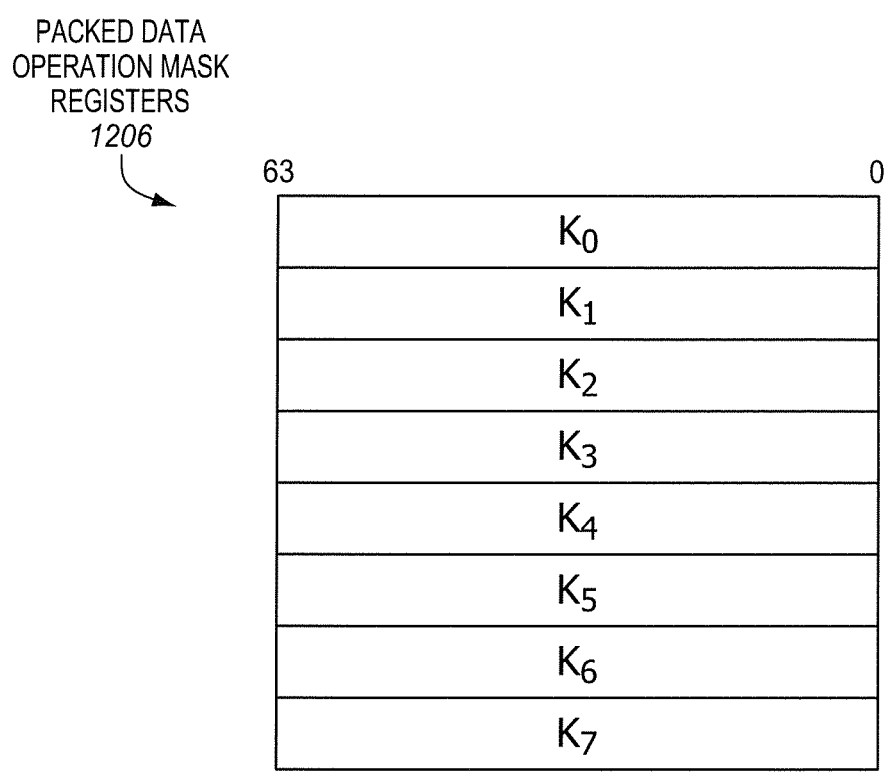
FIG. 12 is a block diagram illustrating an embodiment of packed data operation mask registers.

FIG. 12 is a block diagram of an embodiment of a suitable set of packed data operation mask registers 1206. Each of the registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). The packed data operation mask registers may be implemented in different ways using well known techniques and are not limited to any known particular type of circuit.

Figure 13:
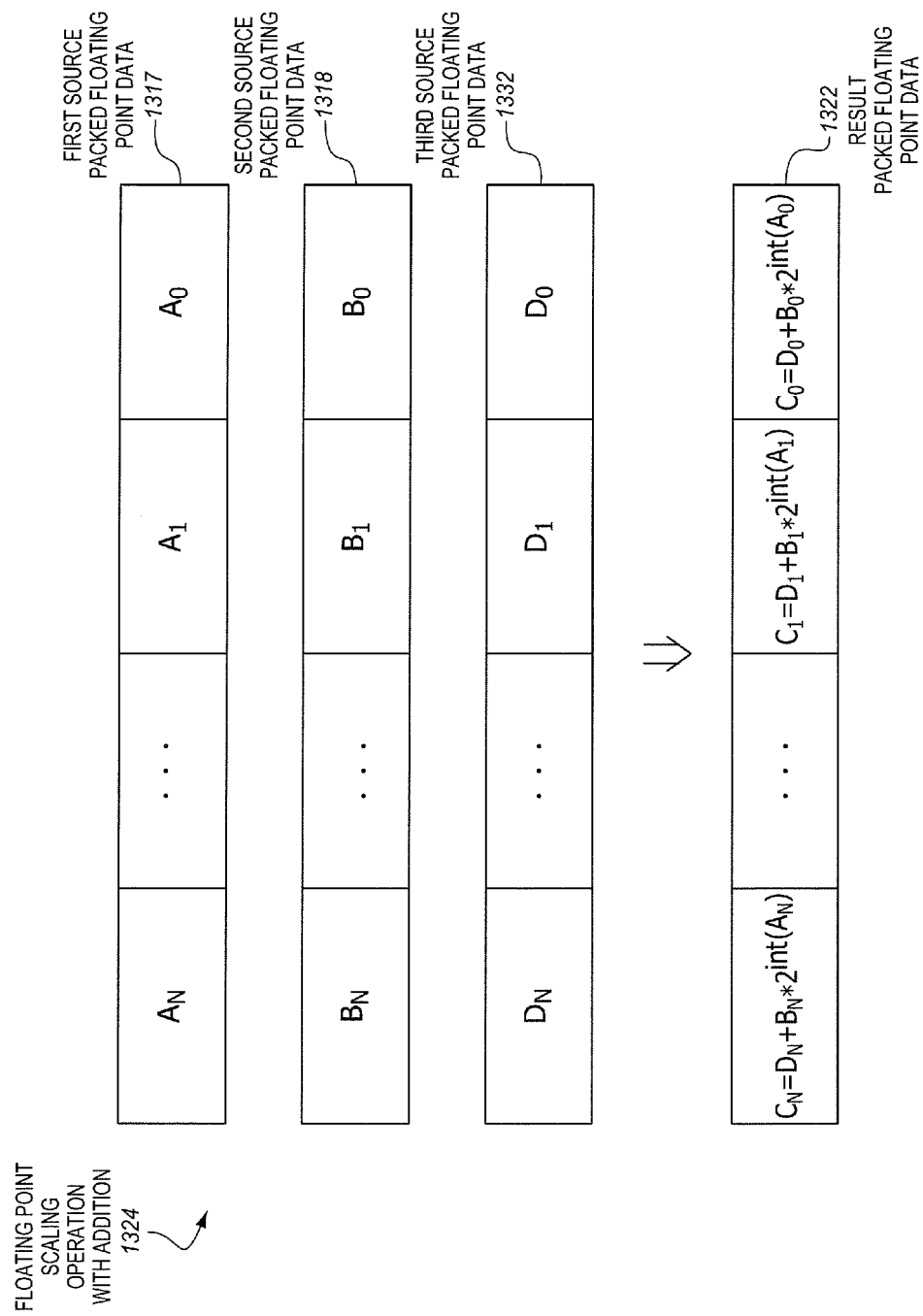
FIG. 13 is a block diagram illustrating an embodiment of a floating point scaling operation with addition.

FIG. 13 is a block diagram illustrating an embodiment of a floating point scaling operation with addition 1324 that may be performed in response to an embodiment of a floating point scaling instruction with addition. The floating point scaling instruction with addition specifies or otherwise indicates a first source 1317 including packed floating point data elements $A_0$-$A_N$, a second source 1318 including packed floating point data elements $B_0$-$B_N$, a third source 1332 including packed floating point data elements $D_0$-$D_N$, and a destination (e.g., a destination storage location).

A result packed floating point data 1322 including a plurality of result floating point data elements $C_0$-$C_N$ is stored in the destination in response to the instruction. Each of the result floating point data elements ($C_i$) includes a sum of the corresponding floating point data element of the third source ($D_i$) added to a product of the corresponding floating point data element of the second source ($B_i$) multiplied by a base (in the illustrated embodiment base 2) raised to a power of an integer representative of the corresponding floating point data element of the first source (int($A_i$)).

FIG. 14 is a block diagram of an embodiment of an instruction format for a floating point scaling instruction 1403. The instruction format includes an operation code or opcode 1433. The opcode may represent a plurality of bits or one or more fields that are operable to identify the instruction and/or the operation to be performed.

As shown, in some embodiments, the instruction format may include a first source specifier 1434 to explicitly specify a first source operand or storage location, a second source specifier 1435 to explicitly specify a second source operand or storage location, and a destination specifier 1436 to explicitly specify a destination operand or storage location where a result is to be stored. By way of example, each of these specifiers may include an address of a register, memory location, or other storage location. Alternatively, as previously mentioned, one or more of the first source, the second source, or the destination may be implicit to the instruction, as opposed to being explicitly specified. For example, one of the sources may optionally be reused as the destination and the initial contents may be overwritten with the result, in which case the destination may be implicitly indicated to be one of the sources. In another embodiment, one or more additional sources may optionally be implicitly indicated or explicitly specified to provide one or more additional operands (e.g., to provide the added data elements 1332 of FIG. 13).

In some embodiments in which the instruction is a floating point scaling instruction with data element broadcast, the instruction format may include an optional broadcast control 1437. The broadcast control may include one or more bits or fields to indicate that data element broadcast is to be performed to broadcast a single source data element accessed from a specified or indicated storage location into a plurality of source data elements used by the instruction.

In some embodiments in which the instruction is a masked floating point scaling instruction, the instruction format may include an optional mask specifier 1438 to explicitly specify a packed data operation mask operand or storage location (e.g., a mask register). Alternatively, the packed data operation mask may be implicitly indicated. In some embodiments, the instruction format may also include an optional type of masking operation specifier 1439. The type of masking operation specifier may specify a type of masking operation. By way of example, the type of masking operation specifier may include a single bit to specify whether merging-masking or zeroing-masking is to be performed. Alternatively, the type of masking operation may be implicitly indicated (e.g., in an implicit control register). As mentioned above, masking is optional and not required.

In some embodiments, the floating point scaling instruction format may include an optional floating point rounding control 1440. The floating point rounding control may override a default floating point rounding mode of a processor and be used to round the final result of the instruction. Floating point operations commonly utilize arithmetic floating point rounding. For example, rounding may be used when the result of a floating-point operation or a conversion to floating-point needs more digits than provided by the significand. By way of example, certain Intel processors have control registers (e.g., machine status and control registers known as MXCSR) that includes rounding mode control bits (e.g., RM) to specify the default rounding mode. The floating point rounding control of the instruction may represent one or more bits or fields to explicitly specify an arithmetic floating point rounding mode that is to override the default floating point rounding mode. In some embodiments, the encoding prefix of the instruction may allow instruction prefix-based rounding control. Examples of suitable rounding modes include, but are not limited to, the following rounding modes: (1) round to nearest, where ties round to the nearest even digit; (2) round down, toward negative infinity, where negative results round away from zero; (3) round up, toward positive infinity, where negative results round toward zero; and (4) round toward zero, truncate. In some embodiments, each of these rounding modes may also have support for an SAE (suppress all exceptions) attribute to disable reporting of floating-point exceptions.

The illustrated instruction format shows examples of the types of fields that may be included in an embodiment of a floating point scaling instruction. As shown, some embodiments may combine broadcasting with masking and may also specify a rounding mode. Alternate embodiments may include a subset of the illustrated fields or may add additional fields. The illustrated order/arrangement of the fields is not required, but rather the fields may be rearranged. Fields need not include contiguous sequences of bits but rather may be composed of non-contiguous or separated bits. In some embodiments, the instruction format may follow an EVEX encoding or instruction format, although this is not required.

Figure 15:
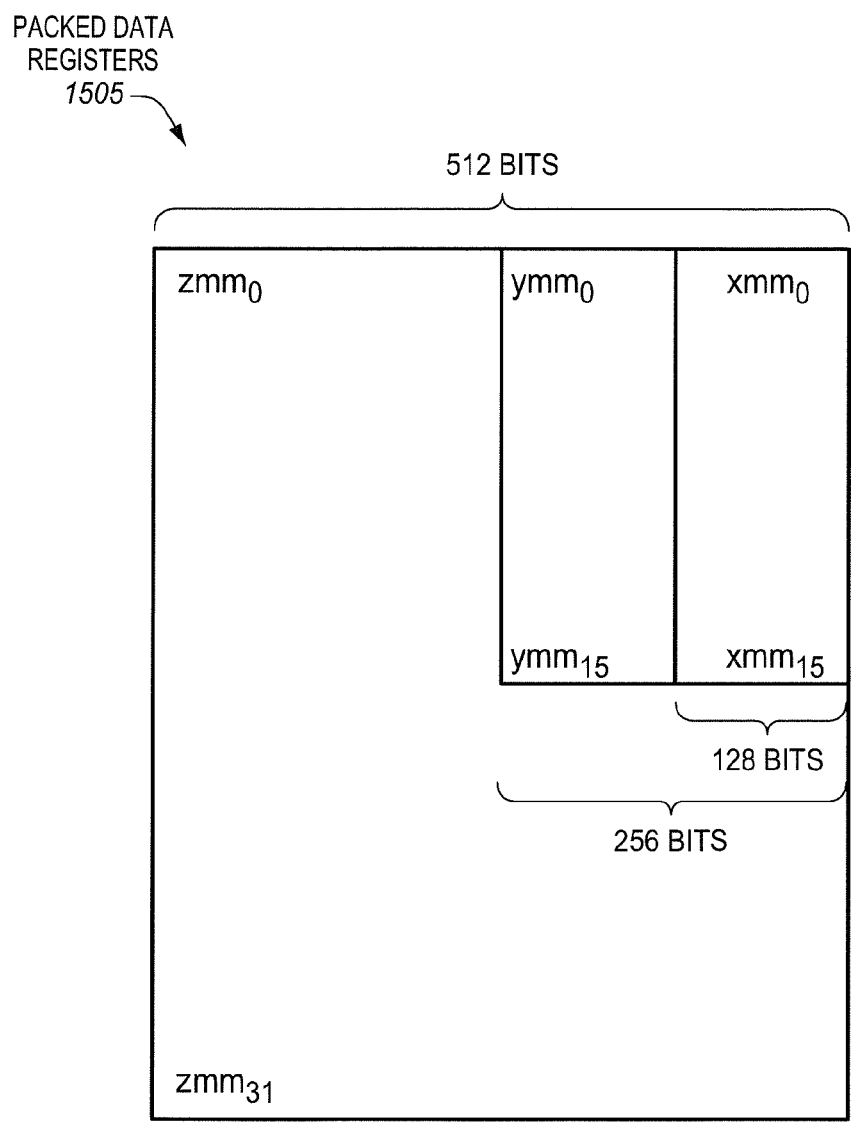
FIG. 15 is a block diagram of an embodiment of packed data registers.

FIG. 15 is a block diagram of an embodiment of a suitable set of packed data registers 1505. The illustrated packed data registers include thirty-two 512-bit packed data or vector registers. These thirty-two 512-bit registers are labeled ZMM0 through ZMM31. In the illustrated embodiment, the lower order 256-bits of the lower sixteen of these registers, namely ZMM0-ZMM15, are aliased or overlaid on respective 256-bit packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data, or 128-bit packed data. The 128-bit registers XMM0-XMM1 are operable to hold 128-bit packed data. Each of the registers may be used to store either packed floating-point data or packed integer data. In some aspects, scalar floating point data may also be stored in the packed data registers. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 16:
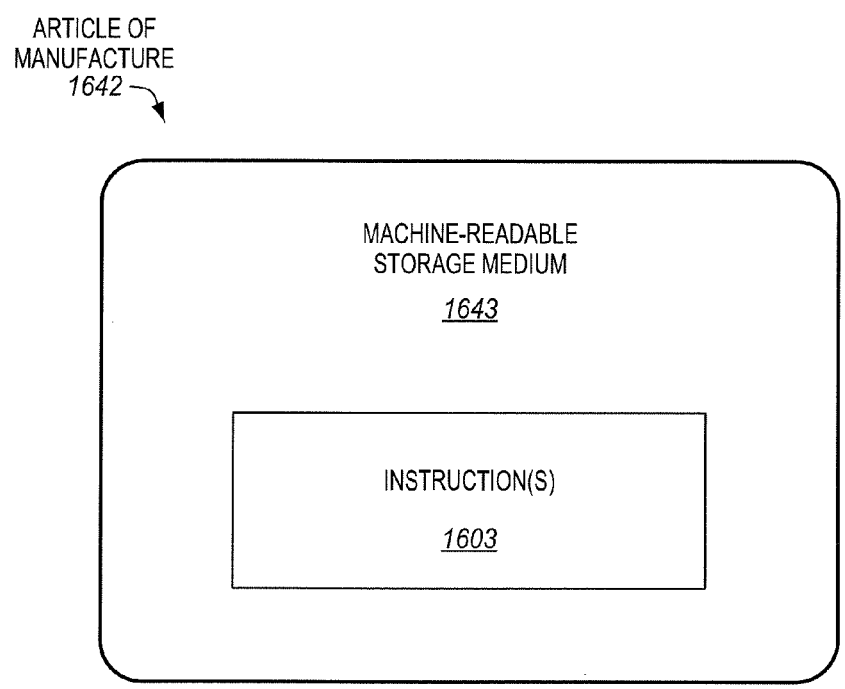
FIG. 16 is a block diagram of an article of manufacture including a machine-readable storage medium storing a floating point scaling instruction.

FIG. 16 is a block diagram of an article of manufacture (e.g., a computer program product) 1642 including a machine-readable storage medium 1643. In some embodiments, the machine-readable storage medium may be a tangible and/or non-transitory machine-readable storage medium. In various example embodiments, the machine-readable storage medium may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid data storage materials, such as, for example, a semiconductor data storage material, a phase-change data storage material, a magnetic data storage material, an optically transparent solid data storage material, etc.

The machine-readable storage medium stores one or more floating point scaling instructions 1603. Each of the floating point scaling instructions indicates a first source including one or more floating point data elements, indicates a second source including one or more corresponding floating point data elements, and indicates a destination. Each of the floating point scaling instructions, if executed by a machine, is operable to cause the machine to store a result in a destination. The result includes one or more corresponding result floating point data elements. Each of the one or more result floating point data elements includes a corresponding floating point data element of the second source multiplied by a base of the one or more floating point data elements of the first source raised to a power of an integer representative of the corresponding floating point data element of the first source. Any of the floating point scaling instructions and associated results disclosed herein is suitable.

Examples of different types of machines include, but are not limited to, processors (e.g., general-purpose processors and special-purpose processors), instruction processing apparatus, and various electronic devices having one or more processors or instruction processing apparatus. A few representative examples of such electronic devices include, but are not limited to, computer systems, desktops, laptops, notebooks, servers, network routers, network switches, nettops, set-top boxes, cellular phones, video game controllers, etc.

To further illustrate certain concepts, consider the following detailed example embodiment of a floating point scaling instruction and operation. This floating point scaling instruction is known as VSCALEFPD which scales packed double precision floating point (float64) values with other double precision floating point values. Table 1 lists opcodes for the instruction and provides a description of the operation performed.

TABLE 1

VSCALEFPD - Scale Packed Float64 Values with Float64 Values

| Opcode/Instruction | Description |
|---|---|
| EVEX.U1.NDS.128.66.0F38.W1 2C/r VSCALEFPD xmm1 {k1}{z}, xmm2, xmm3/B64(mV){er} | Scale the packed double-precision floating point values in xmm2 using values from xmm3/mV. Under writemask k1. |
| EVEX.U1.NDS.256.66.0F38.W1 2C/r VSCALEFPD ymm1 {k1}{z}, ymm2, ymm3/B64(mV){er} | Scale the packed double-precision floating-point values in ymm2 using values from ymm3/mV. Under writemask k1. |
| EVEX.U1.NDS.512.66.0F38.W1 2C/r VSCALEFPD zmm1 {k1}{z}, zmm2, zmm3/B64(mV){er} | Scale the packed double-precision floating-point values in zmm2 using values from zmm3/mV. Under writemask k1. |

EVEX refers to the EVEX encoding described elsewhere herein. Xmm, ymm, and zmm represent 128-bit, 256-bit, and 512-bit packed data registers. The {k1} indicates a mask register (e.g., one of k0-k7) that is used as a writemask. The {z} indicates the type of masking (e.g., merging-masking or zeroing masking). The {er} indicates support for embedded rounding control, which is applicable to the register-register form of the instruction, and also implies support for suppress all exceptions (SAE). The B64 (mV) indicates a broadcast vector memory operand for a broadcast of a 64-bit double precision floating point element into a vector.

Table 2 lists the instruction operand encoding. ModRM allows for register (reg) or register or memory (r/m). The (r) indicates read and the (w) indicates write.

TABLE 2

Instruction Operand Encoding

| Operand1 | Operand2 | Operand3 |
|---|---|---|
| ModRM:reg(w) | VEX.vvvv (r) | ModRM:r/m (r) |

The VSCALEFPD operation performs a floating point scale of the packed double-precision floating-point values in the first source operand by multiplying it by 2 power of the double-precision floating point values in second source operand. The equation of this operation is given by:

$$zmm1 = zmm2 * 2^{floor(zmm3)}.$$

Floor(zmm3) means maximum integer value≤zmm3.
If the result cannot be represented with a double-precision floating-point, then the properly signed INF (for positive scaling operand) or 0 (for negative scaling operand) will be returned.
The pseudocode for the operation is shown below. In this pseudocode, SRC1 represents a first source, SRC2 represents a second source, and DEST represents a destination. KL represents a length of the mask and VL represents a length of the vector or packed data. SET_RM sets the rounding mode from either embedded rounding control (EVEX.RC) or from a default rounding mode in a control register (MXCSR.RM). EVEX.b==1 enables embedded rounding mode and SAE control for a register-register instruction. EVEX.b==1 enables embedded broadcast when SRC2*is memory*. The symbol ← represents storing.
Operation:

```
SCALE(SRC1, SRC2)
{
        /* SRC2 is a 64 bits floating point value */
        DEST[63:0] = SRC1[63:0] * POW(2, Floor(SRC2[63:0]))
}
VSCALEFPD (EVEX encoded versions)
(KL, VL) = (2, 128), (4, 256), (8, 512)
IF (VL == 512) AND (EVEX.b == 1) AND (SRC2 *is register*)
    THEN
            SET_RM(EVEX.RC);
    ELSE
            SET_RM(MXCSR.RM);
FI;
FOR j ← 0 TO KL-1
    i ← j * 64
    IF k1[j] OR *no writemask* THEN
            IF (EVEX.b == 1) AND (SRC2 *is memory*)
                    THEN  DEST[i+63:i]  ←  SCALE(SRC1[i+63:i],  SRC2[63:0]);
broadcast
                    ELSE DEST[i+63:i] ← SCALE(SRC1[i+63:i], SRC2[i+63:i]);
            FI;
        ELSE
            IF *merging-masking*                    ; merging-masking
                    THEN *DEST[i+63:i] remains unchanged*
                    ELSE                             ; zeroing-masking
                            DEST[i+63:i] = 0
            FI
    FI;
ENDFOR
DEST[MAX_VL-1:VL] ← 0
```

This is just one example embodiment. Other embodiments for single precision floating point values, scalar double precision floating point, and scalar single precision floating point are also possible. Still other embodiments may omit masking and/or broadcast or other features shown.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below.

Table 3 lists special cases for VSCALEFPD. Inf refers to infinity, QNaN refers to quiet not a number.

TABLE 3

Special Cases

| | Src2 | | | |
|---|---|---|---|---|
| Src1 | +/−NaN | +Inf | −Inf | 0/Denorm/Norm |
| +/−NaN | QNaN(Src2) | +Inf | +0 | QNaN (Src1) |
| +/− Inf | QNaN(Src2) | Src1 | QNaN Indefinite | Src1 |
| +/−0 | QNaN(Src2) | QNaN Indefinite | Src1 | Src1 |
| Denorm/ Norm | QNaN(Src2) | Sign (Src1)*Inf | Sign (Src1)*0 | Compute Result |

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 17A:
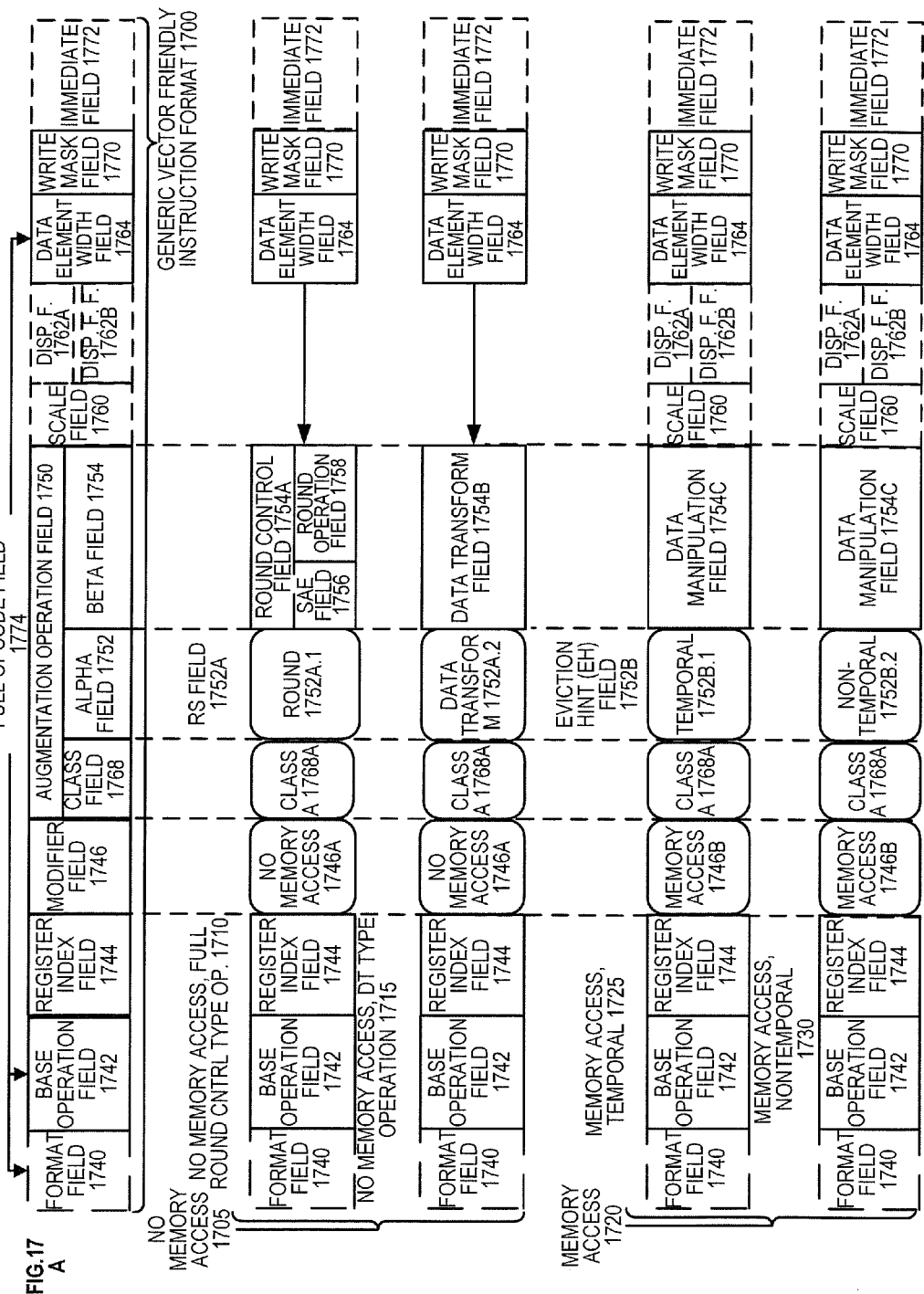
FIG. 17A is a block diagram illustrating a generic vector friendly instruction format and class A instruction templates thereof according to embodiments of the invention.

FIGS. 17A-17B are block diagrams illustrating a generic vector friendly instruction format and instruction templates thereof according to embodiments of the invention. FIG. 17A is a block diagram illustrating a generic vector friendly instruction format and class A instruction templates thereof according to embodiments of the invention; while FIG. 17B is a block diagram illustrating the generic vector friendly instruction format and class B instruction templates thereof according to embodiments of the invention. Specifically, a generic vector friendly instruction format 1700 for which are defined class A and class B instruction templates, both of which include no memory access 1705 instruction templates and memory access 1720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 17A include: 1) within the no memory access 1705 instruction templates there is shown a no memory access, full round control type operation 1710 instruction template and a no memory access, data transform type operation 1715 instruction template; and 2) within the memory access 1720 instruction templates there is shown a memory access, temporal 1725 instruction template and a memory access, non-temporal 1730 instruction template. The class B instruction templates in FIG. 17B include: 1) within the no memory access 1705 instruction templates there is shown a no memory access, write mask control, partial round control type operation 1712 instruction template and a no memory access, write mask control, vsize type operation 1717 instruction template; and 2) within the memory access 1720 instruction templates there is shown a memory access, write mask control 1727 instruction template.

The generic vector friendly instruction format 1700 includes the following fields listed below in the order illustrated in FIGS. 17A-17B.

Format field 1740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1742—its content distinguishes different base operations.

Register index field 1744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1746—its content distinguishes occurrences of instructions in the generic vector instruction format that specify memory access from those that do not; that is, between no memory access 1705 instruction templates and memory access 1720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1750—its content distinguishes which one of a variety of different operations to be performed in addition to the base operation. This field is context specific. In one embodiment of the invention, this field is divided into a class field 1768, an alpha field 1752, and a beta field 1754. The augmentation operation field 1750 allows common groups of operations to be performed in a single instruction rather than 2, 3, or 4 instructions.

Scale field 1760—its content allows for the scaling of the index field's content for memory address generation (e.g., for address generation that uses $2^{scale}$*index+base).

Displacement Field 1762A—its content is used as part of memory address generation (e.g., for address generation that uses $2^{scale}$*index+base+displacement).

Displacement Factor Field 1762B (note that the juxtaposition of displacement field 1762A directly over displacement factor field 1762B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1774 (described later herein) and the data manipulation field 1754C. The displacement field 1762A and the displacement factor field 1762B are optional in the sense that they are not used for the no memory access 1705 instruction templates and/or different embodiments may implement only one or none of the two.

Data element width field 1764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1770 allows for partial vector operations, including loads, stores, arithmetic, logical, etc. While embodiments of the invention are described in which the write mask field's 1770 content selects one of a number of write mask registers that contains the write mask to be used (and thus the write mask field's 1770 content indirectly identifies that masking to be performed), alternative embodiments instead or additional allow the mask write field's 1770 content to directly specify the masking to be performed.

Immediate field 1772—its content allows for the specification of an immediate. This field is optional in the sense that is it not present in an implementation of the generic vector friendly format that does not support immediate and it is not present in instructions that do not use an immediate.

Class field 1768—its content distinguishes between different classes of instructions. With reference to FIGS. 17A-B, the contents of this field select between class A and class B instructions. In FIGS. 17A-B, rounded corner squares are used to indicate a specific value is present in a field (e.g., class A 1768A and class B 1768B for the class field 1768 respectively in FIGS. 17A-B).

Instruction Templates of Class A

In the case of the non-memory access 1705 instruction templates of class A, the alpha field 1752 is interpreted as an RS field 1752A, whose content distinguishes which one of the different augmentation operation types are to be performed (e.g., round 1752A.1 and data transform 1752A.2 are respectively specified for the no memory access, round type operation 1710 and the no memory access, data transform type operation 1715 instruction templates), while the beta field 1754 distinguishes which of the operations of the specified type is to be performed. In the no memory access 1705 instruction templates, the scale field 1760, the displacement field 1762A, and the displacement scale filed 1762B are not present.

No-Memory Access Instruction Templates—Full Round Control Type Operation

In the no memory access full round control type operation 1710 instruction template, the beta field 1754 is interpreted as a round control field 1754A, whose content(s) provide static rounding. While in the described embodiments of the invention the round control field 1754A includes a suppress all floating point exceptions (SAE) field 1756 and a round operation control field 1758, alternative embodiments may support may encode both these concepts into the same field or only have one or the other of these concepts/fields (e.g., may have only the round operation control field 1758).

SAE field 1756—its content distinguishes whether or not to disable the exception event reporting; when the SAE field's 1756 content indicates suppression is enabled, a given instruction does not report any kind of floating-point exception flag and does not raise any floating point exception handler.

Round operation control field 1758—its content distinguishes which one of a group of rounding operations to perform (e.g., Round-up, Round-down, Round-towards-zero and Round-to-nearest). Thus, the round operation control field 1758 allows for the changing of the rounding mode on a per instruction basis. In one embodiment of the invention where a processor includes a control register for specifying rounding modes, the round operation control field's 1750 content overrides that register value.

No Memory Access Instruction Templates—Data Transform Type Operation

In the no memory access data transform type operation 1715 instruction template, the beta field 1754 is interpreted as a data transform field 1754B, whose content distinguishes which one of a number of data transforms is to be performed (e.g., no data transform, swizzle, broadcast).

In the case of a memory access 1720 instruction template of class A, the alpha field 1752 is interpreted as an eviction hint field 1752B, whose content distinguishes which one of the eviction hints is to be used (in FIG. 17A, temporal 1752B.1 and non-temporal 1752B.2 are respectively specified for the memory access, temporal 1725 instruction template and the memory access, non-temporal 1730 instruction template), while the beta field 1754 is interpreted as a data manipulation field 1754C, whose content distinguishes which one of a number of data manipulation operations (also known as primitives) is to be performed (e.g., no manipulation; broadcast; up conversion of a source; and down conversion of a destination). The memory access 1720 instruction templates include the scale field 1760, and optionally the displacement field 1762A or the displacement scale field 1762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching.

This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1752 is interpreted as a write mask control (Z) field 1752C, whose content distinguishes whether the write masking controlled by the write mask field 1770 should be a merging or a zeroing.

In the case of the non-memory access 1705 instruction templates of class B, part of the beta field 1754 is interpreted as an RL field 1757A, whose content distinguishes which one of the different augmentation operation types are to be performed (e.g., round 1757A.1 and vector length (VSIZE) 1757A.2 are respectively specified for the no memory access, write mask control, partial round control type operation 1712 instruction template and the no memory access, write mask control, VSIZE type operation 1717 instruction template), while the rest of the beta field 1754 distinguishes which of the operations of the specified type is to be performed. In the no memory access 1705 instruction templates, the scale field 1760, the displacement field 1762A, and the displacement scale filed 1762B are not present.

In the no memory access, write mask control, partial round control type operation 1710 instruction template, the rest of the beta field 1754 is interpreted as a round operation field 1759A and exception event reporting is disabled (a given instruction does not report any kind of floating-point exception flag and does not raise any floating point exception handler).

Round operation control field 1759A—just as round operation control field 1758, its content distinguishes which one of a group of rounding operations to perform (e.g., Round-up, Round-down, Round-towards-zero and Round-to-nearest). Thus, the round operation control field 1759A allows for the changing of the rounding mode on a per instruction basis. In one embodiment of the invention where a processor includes a control register for specifying rounding modes, the round operation control field's 1750 content overrides that register value.

In the no memory access, write mask control, VSIZE type operation 1717 instruction template, the rest of the beta field 1754 is interpreted as a vector length field 1759B, whose content distinguishes which one of a number of data vector lengths is to be performed on (e.g., 128, 256, or 512 byte).

In the case of a memory access 1720 instruction template of class B, part of the beta field 1754 is interpreted as a broadcast field 1757B, whose content distinguishes whether or not the broadcast type data manipulation operation is to be performed, while the rest of the beta field 1754 is interpreted the vector length field 1759B. The memory access 1720 instruction templates include the scale field 1760, and optionally the displacement field 1762A or the displacement scale field 1762B.

With regard to the generic vector friendly instruction format 1700, a full opcode field 1774 is shown including the format field 1740, the base operation field 1742, and the data element width field 1764. While one embodiment is shown where the full opcode field 1774 includes all of these fields, the full opcode field 1774 includes less than all of these fields in embodiments that do not support all of them. The full opcode field 1774 provides the operation code (opcode).

The augmentation operation field 1750, the data element width field 1764, and the write mask field 1770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 18 is a block diagram illustrating an exemplary specific vector friendly instruction format according to embodiments of the invention. FIG. 18 shows a specific vector friendly instruction format 1800 that is specific in the sense that it specifies the location, size, interpretation, and order of the fields, as well as values for some of those fields. The specific vector friendly instruction format 1800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 17 into which the fields from FIG. 18 map are illustrated.

It should be understood that, although embodiments of the invention are described with reference to the specific vector friendly instruction format 1800 in the context of the generic vector friendly instruction format 1700 for illustrative purposes, the invention is not limited to the specific vector friendly instruction format 1800 except where claimed. For example, the generic vector friendly instruction format 1700 contemplates a variety of possible sizes for the various fields, while the specific vector friendly instruction format 1800 is shown as having fields of specific sizes. By way of specific example, while the data element width field 1764 is illustrated as a one bit field in the specific vector friendly instruction format 1800, the invention is not so limited (that is, the generic vector friendly instruction format 1700 contemplates other sizes of the data element width field 1764).

The generic vector friendly instruction format 1700 includes the following fields listed below in the order illustrated in FIG. 18A.

EVEX Prefix (Bytes 0-3) 1802—is encoded in a four-byte form.

Format Field 1740 (EVEX Byte 0, bits [7:0])—the first byte (EVEX Byte 0) is the format field 1740 and it contains 0x62 (the unique value used for distinguishing the vector friendly instruction format in one embodiment of the invention).

The second-fourth bytes (EVEX Bytes 1-3) include a number of bit fields providing specific capability.

REX field 1805 (EVEX Byte 1, bits [7-5])—consists of a EVEX.R bit field (EVEX Byte 1, bit [7]-R), EVEX.X bit field (EVEX byte 1, bit [6]-X), and 1757BEX byte 1, bit[5]-B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1710—this is the first part of the REX' field 1710 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1815 (EVEX byte 1, bits [3:0]-mmmm)—its content encodes an implied leading opcode byte (0F, 0F 38, or 0F 3).

Data element width field 1764 (EVEX byte 2, bit [7]—W)—is represented by the notation EVEX.W. EVEX.W is used to define the granularity (size) of the datatype (either 32-bit data elements or 64-bit data elements).

EVEX.vvvv 1820 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1820 encodes the 4 low-order bits of the first source register specifier stored in inverted (is complement) form. Depending on the instruction, an extra different EVEX bit field is used to extend the specifier size to 32 registers.

EVEX.U 1768 Class field (EVEX byte 2, bit [2]—U)—If EVEX.U=0, it indicates class A or EVEX.U0; if EVEX.U=1, it indicates class B or EVEX.U1.

Prefix encoding field 1825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1752 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1754 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1770 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1830 (Byte 4) is also known as the opcode byte. Part of the opcode is specified in this field.

MOD R/M Field 1840 (Byte 5) includes MOD field 1842, Reg field 1844, and R/M field 1846. As previously described, the MOD field's 1842 content distinguishes between memory access and non-memory access operations. The role of Reg field 1844 can be summarized to two situations: encoding either the destination register operand or a source register operand, or be treated as an opcode extension and not used to encode any instruction operand. The role of R/M field 1846 may include the following: encoding the instruction operand that references a memory address, or encoding either the destination register operand or a source register operand.

Scale, Index, Base (SIB) Byte (Byte 6)—As previously described, the scale field's 1750 content is used for memory address generation. SIB.xxx 1854 and SIB.bbb 1856—the contents of these fields have been previously referred to with regard to the register indexes Xxxx and Bbbb.

Displacement field 1762A (Bytes 7-10)—when MOD field 1842 contains 10, bytes 7-10 are the displacement field 1762A, and it works the same as the legacy 32-bit displacement (disp32) and works at byte granularity.

Displacement factor field 1762B (Byte 7)—when MOD field 1842 contains 01, byte 7 is the displacement factor field 1762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1762B is a reinterpretation of disp8; when using displacement factor field 1762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1762B substitutes the legacy x86 instruction set 8-bit displacement. Thus, the displacement factor field 1762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1772 operates as previously described.

Full Opcode Field

FIG. 18B is a block diagram illustrating the fields of the specific vector friendly instruction format 1800 that make up the full opcode field 1774 according to one embodiment of the invention. Specifically, the full opcode field 1774 includes the format field 1740, the base operation field 1742, and the data element width (W) field 1764. The base operation field 1742 includes the prefix encoding field 1825, the opcode map field 1815, and the real opcode field 1830.

Register Index Field

FIG. 18C is a block diagram illustrating the fields of the specific vector friendly instruction format 1800 that make up the register index field 1744 according to one embodiment of the invention. Specifically, the register index field 1744 includes the REX field 1805, the REX' field 1810, the MODR/M.reg field 1844, the MODR/M.r/m field 1846, the VVVV field 1820, xxx field 1854, and the bbb field 1856.

Augmentation Operation Field

FIG. 18D is a block diagram illustrating the fields of the specific vector friendly instruction format 1800 that make up the augmentation operation field 1750 according to one embodiment of the invention. When the class (U) field 1768 contains 0, it signifies EVEX.U0 (class A 1768A); when it contains 1, it signifies EVEX.U1 (class B 1768B). When U=0 and the MOD field 1842 contains 11 (signifying a no memory access operation), the alpha field 1752 (EVEX byte 3, bit [7]-EH) is interpreted as the rs field 1752A. When the rs field 1752A contains a 1 (round 1752A.1), the beta field 1754 (EVEX byte 3, bits [6:4]—SSS) is interpreted as the round control field 1754A. The round control field 1754A includes a one bit SAE field 1756 and a two bit round operation field 1758. When the rs field 1752A contains a 0 (data transform 1752A.2), the beta field 1754 (EVEX byte 3, bits [6:4]—SSS) is interpreted as a three bit data transform field 1754B. When U=0 and the MOD field 1842 contains 00, 01, or 10 (signifying a memory access operation), the alpha field 1752 (EVEX byte 3, bit [7]-EH) is interpreted as the eviction hint (EH) field 1752B and the beta field 1754 (EVEX byte 3, bits [6:4]—SSS) is interpreted as a three bit data manipulation field 1754C.

When U=1, the alpha field 1752 (EVEX byte 3, bit [7]-EH) is interpreted as the write mask control (Z) field 1752C. When U=1 and the MOD field 1842 contains 11 (signifying a no memory access operation), part of the beta field 1754 (EVEX byte 3, bit [4]—$S_0$) is interpreted as the RL field 1757A; when it contains a 1 (round 1757A.1) the rest of the beta field 1754 (EVEX byte 3, bit [6-5]—$S_{2-1}$) is interpreted as the round operation field 1759A, while when the RL field 1757A contains a 0 (VSIZE 1757.A2) the rest of the beta field 1754 (EVEX byte 3, bit [6-5]—$S_{2-1}$) is interpreted as the vector length field 1759B (EVEX byte 3, bit [6-5]-$L_{1-0}$). When U=1 and the MOD field 1842 contains 00, 01, or 10 (signifying a memory access operation), the beta field 1754 (EVEX byte 3, bits [6:4]—SSS) is interpreted as the vector length field 1759B (EVEX byte 3, bit [6-5]-$L_{1-0}$) and the broadcast field 1757B (EVEX byte 3, bit [4]-B).

Exemplary Register Architecture

FIG. 19 is a block diagram of a register architecture 1900 according to one embodiment of the invention. In the embodiment illustrated, there are 32 vector registers 1910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1800 operates on these overlaid register file as illustrated in the below tables.

| Adjustable Vector Length | Class | Operations | Registers |
| --- | --- | --- | --- |
| Instruction Templates that do not include the vector length field 1759B | A (FIG. 17A; U = 0) | 1710, 1715, 1725, 1730 | zmm registers (the vector length is 64 byte) |
| | B (FIG. 17B; U = 1) | 1712 | zmm registers (the vector length is 64 byte) |
| Instruction templates that do include the vector length field 1759B | B (FIG. 17B; U = 1) | 1717, 1727 | zmm, ymm, or xmm registers (the vector length is 64 byte, 32 byte, or 16 byte) depending on the vector length field 1759B |

In other words, the vector length field 1759B selects between a maximum length and one or more other shorter lengths, where each such shorter length is half the length of the preceding length; and instructions templates without the vector length field 1759B operate on the maximum vector length. Further, in one embodiment, the class B instruction templates of the specific vector friendly instruction format 1800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1915—in the embodiment illustrated, there are 8 write mask registers (k0 through k7), each 64 bits in size. In an alternate embodiment, the write mask registers 1915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1945, on which is aliased the MMX packed integer flat register file 1950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 20A is a block diagram illustrating both an exemplary in-order pipeline and an exemplary register renaming, out-of-order issue/execution pipeline according to embodiments of the invention. FIG. 20B is a block diagram illustrating both an exemplary embodiment of an in-order architecture core and an exemplary register renaming, out-of-order issue/execution architecture core to be included in a processor according to embodiments of the invention. The solid lined boxes in FIGS. 20A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 20A, a processor pipeline 2000 includes a fetch stage 2002, a length decode stage 2004, a decode stage 2006, an allocation stage 2008, a renaming stage 2010, a scheduling (also known as a dispatch or issue) stage 2012, a register read/memory read stage 2014, an execute stage 2016, a write back/memory write stage 2018, an exception handling stage 2022, and a commit stage 2024.

FIG. 20B shows processor core 2090 including a front end unit 2030 coupled to an execution engine unit 2050, and both are coupled to a memory unit 2070. The core 2090 may be a reduced instruction set computing (RISC) core, a complex instruction set computing (CISC) core, a very long instruction word (VLIW) core, or a hybrid or alternative core type. As yet another option, the core 2090 may be a special-purpose core, such as, for example, a network or communication core, compression engine, coprocessor core, general purpose computing graphics processing unit (GPGPU) core, graphics core, or the like.

The front end unit 2030 includes a branch prediction unit 2032 coupled to an instruction cache unit 2034, which is coupled to an instruction translation lookaside buffer (TLB) 2036, which is coupled to an instruction fetch unit 2038, which is coupled to a decode unit 2040. The decode unit 2040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2090 includes a microcode ROM or other medium that stores microcode for certain macroinstructions (e.g., in decode unit 2040 or otherwise within the front end unit 2030). The decode unit 2040 is coupled to a rename/allocator unit 2052 in the execution engine unit 2050.

The execution engine unit 2050 includes the rename/allocator unit 2052 coupled to a retirement unit 2054 and a set of one or more scheduler unit(s) 2056. The scheduler unit(s) 2056 represents any number of different schedulers, including reservations stations, central instruction window, etc. The scheduler unit(s) 2056 is coupled to the physical register file(s) unit(s) 2058. Each of the physical register file(s) units 2058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2058 comprises a vector registers unit, a write mask registers unit, and a scalar registers unit. These register units may provide architectural vector registers, vector mask registers, and general purpose registers. The physical register file(s) unit(s) 2058 is overlapped by the retirement unit 2054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2054 and the physical register file(s) unit(s) 2058 are coupled to the execution cluster(s) 2060. The execution cluster(s) 2060 includes a set of one or more execution units 2062 and a set of one or more memory access units 2064. The execution units 2062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2056, physical register file(s) unit(s) 2058, and execution cluster(s) 2060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2064). It should also be understood that where separate pipelines are used, one or more of these pipelines may be out-of-order issue/execution and the rest in-order.

The set of memory access units 2064 is coupled to the memory unit 2070, which includes a data TLB unit 2072 coupled to a data cache unit 2074 coupled to a level 2 (L2) cache unit 2076. In one exemplary embodiment, the memory access units 2064 may include a load unit, a store address unit, and a store data unit, each of which is coupled to the data TLB unit 2072 in the memory unit 2070. The instruction cache unit 2034 is further coupled to a level 2 (L2) cache unit 2076 in the memory unit 2070. The L2 cache unit 2076 is coupled to one or more other levels of cache and eventually to a main memory.

By way of example, the exemplary register renaming, out-of-order issue/execution core architecture may implement the pipeline 2000 as follows: 1) the instruction fetch 2038 performs the fetch and length decoding stages 2002 and 2004; 2) the decode unit 2040 performs the decode stage 2006; 3) the rename/allocator unit 2052 performs the allocation stage 2008 and renaming stage 2010; 4) the scheduler unit(s) 2056 performs the schedule stage 2012; 5) the physical register file(s) unit(s) 2058 and the memory unit 2070 perform the register read/memory read stage 2014; the execution cluster 2060 perform the execute stage 2016; 6) the memory unit 2070 and the physical register file(s) unit(s) 2058 perform the write back/memory write stage 2018; 7) various units may be involved in the exception handling stage 2022; and 8) the retirement unit 2054 and the physical register file(s) unit(s) 2058 perform the commit stage 2024.

The core 2090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2034/2074 and a shared L2 cache unit 2076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 21B:
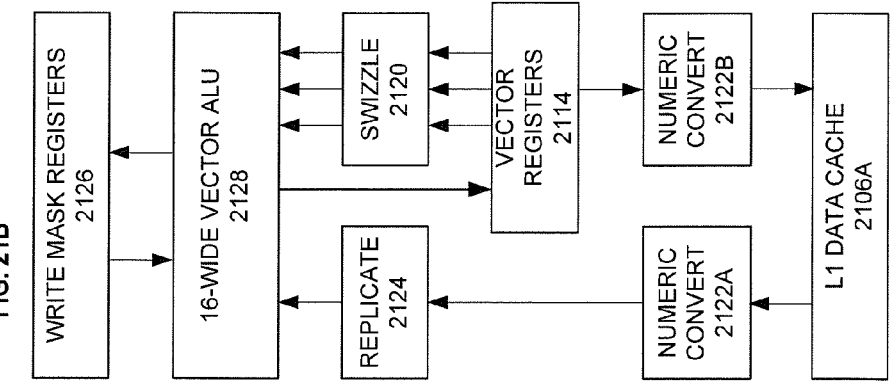
FIG. 21B is an expanded view of part of the processor core in FIG. 21A according to embodiments of the invention.
Figure 21A:
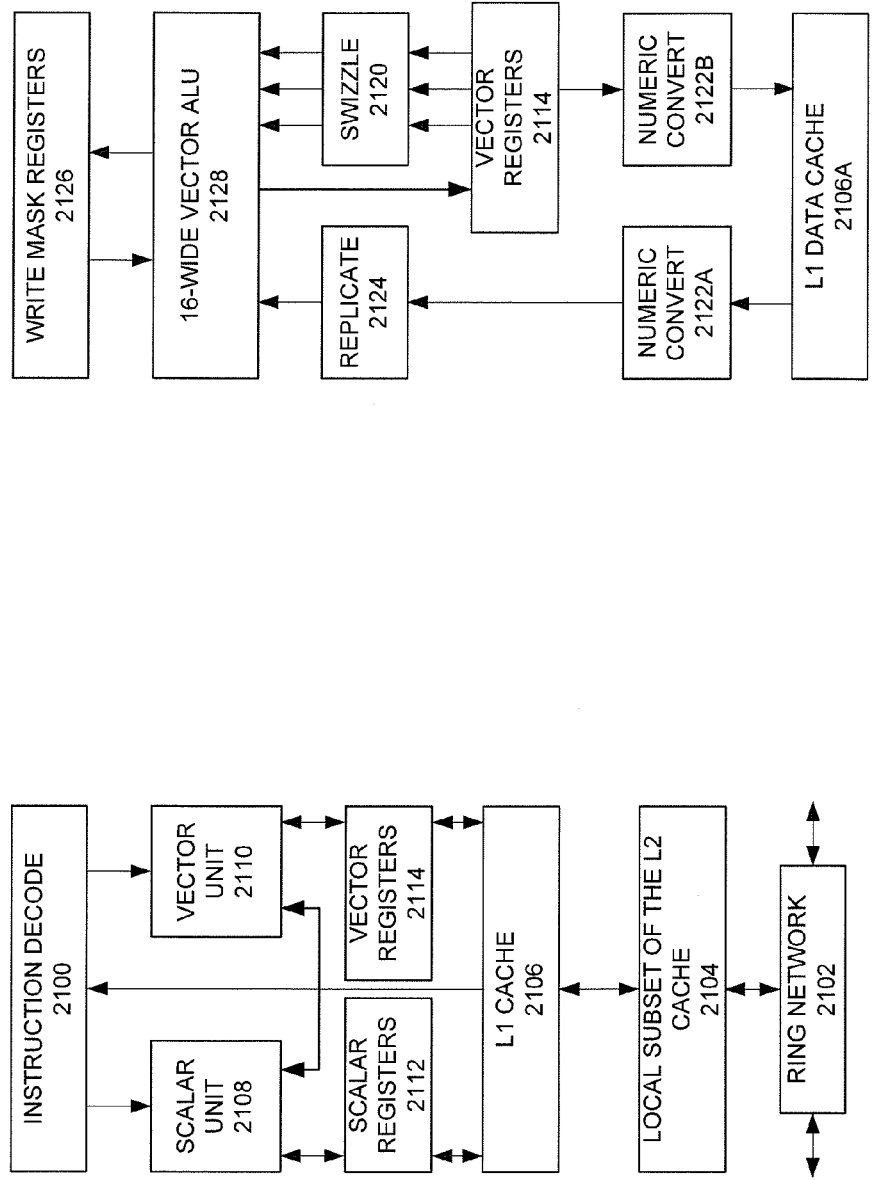
FIG. 21A is a block diagram of a single processor core, along with its connection to the on-die interconnect network and with its local subset of the Level 2 (L2) cache 2104, according to embodiments of the invention.

FIGS. 21A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 21A is a block diagram of a single processor core, along with its connection to the on-die interconnect network 2102 and with its local subset of the Level 2 (L2) cache 2104, according to embodiments of the invention. In one embodiment, an instruction decoder 2100 supports the x86 instruction set with a packed data instruction set extension. An L1 cache 2106 allows low-latency accesses to cache memory into the scalar and vector units. While in one embodiment (to simplify the design), a scalar unit 2108 and a vector unit 2110 use separate register sets (respectively, scalar registers 2112 and vector registers 2114) and data transferred between them is written to memory and then read back in from a level 1 (L1) cache 2106, alternative embodiments of the invention may use a different approach (e.g., use a single register set or include a communication path that allow data to be transferred between the two register files without being written and read back).

The local subset of the L2 cache 2104 is part of a global L2 cache that is divided into separate local subsets, one per processor core. Each processor core has a direct access path to its own local subset of the L2 cache 2104. Data read by a processor core is stored in its L2 cache subset 2104 and can be accessed quickly, in parallel with other processor cores accessing their own local L2 cache subsets. Data written by a processor core is stored in its own L2 cache subset 2104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 21B is an expanded view of part of the processor core in FIG. 21A according to embodiments of the invention. FIG. 21B includes an L1 data cache 2106A part of the L1 cache 2104, as well as more detail regarding the vector unit 2110 and the vector registers 2114. Specifically, the vector unit 2110 is a 16-wide vector processing unit (VPU) (see the 16-wide ALU 2128), which executes one or more of integer, single-precision float, and double-precision float instructions. The VPU supports swizzling the register inputs with swizzle unit 2120, numeric conversion with numeric convert units 2122A-B, and replication with replication unit 2124 on the memory input. Write mask registers 2126 allow predicating resulting vector writes.

Processor with Integrated Memory Controller and Graphics

Figure 22:
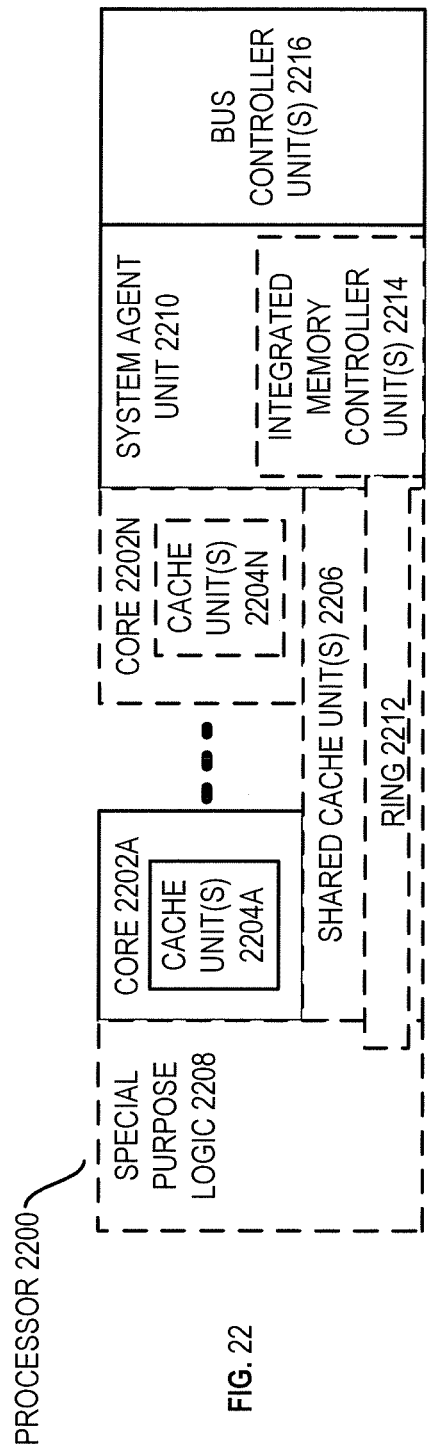
FIG. 22 is a block diagram of a processor that may have more than one core, may have an integrated memory controller, and may have integrated graphics according to embodiments of the invention.

FIG. 22 is a block diagram of a processor 2200 that may have more than one core, may have an integrated memory controller, and may have integrated graphics according to embodiments of the invention. The solid lined boxes in FIG. 22 illustrate a processor 2200 with a single core 2202A, a system agent 2210, a set of one or more bus controller units 2216, while the optional addition of the dashed lined boxes illustrates an alternative processor 2200 with multiple cores 2202A-N, a set of one or more integrated memory controller unit(s) 2214 in the system agent unit 2210, and special purpose logic 2208.

Thus, different implementations of the processor 2200 may include: 1) a CPU with the special purpose logic 2208 being integrated graphics and/or scientific (throughput) logic (which may include one or more cores), and the cores 2202A-N being one or more general purpose cores (e.g., general purpose in-order cores, general purpose out-of-order cores, a combination of the two); 2) a coprocessor with the cores 2202A-N being a large number of special purpose cores intended primarily for graphics and/or scientific (throughput); and 3) a coprocessor with the cores 2202A-N being a large number of general purpose in-order cores. Thus, the processor 2200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2206, and external memory (not shown) coupled to the set of integrated memory controller units 2214. The set of shared cache units 2206 may include one or more mid-level caches, such as level 2 (L2), level 3 (L3), level 4 (L4), or other levels of cache, a last level cache (LLC), and/or combinations thereof. While in one embodiment a ring based interconnect unit 2212 interconnects the integrated graphics logic 2208, the set of shared cache units 2206, and the system agent unit 2210/integrated memory controller unit(s) 2214, alternative embodiments may use any number of well-known techniques for interconnecting such units. In one embodiment, coherency is maintained between one or more cache units 2206 and cores 2202-A-N.

In some embodiments, one or more of the cores 2202A-N are capable of multithreading. The system agent 2210 includes those components coordinating and operating cores 2202A-N. The system agent unit 2210 may include for example a power control unit (PCU) and a display unit. The PCU may be or include logic and components needed for regulating the power state of the cores 2202A-N and the integrated graphics logic 2208. The display unit is for driving one or more externally connected displays.

The cores 2202A-N may be homogenous or heterogeneous in terms of architecture instruction set; that is, two or more of the cores 2202A-N may be capable of execution the same instruction set, while others may be capable of executing only a subset of that instruction set or a different instruction set.

Exemplary Computer Architectures

FIGS. 23-26 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 23:
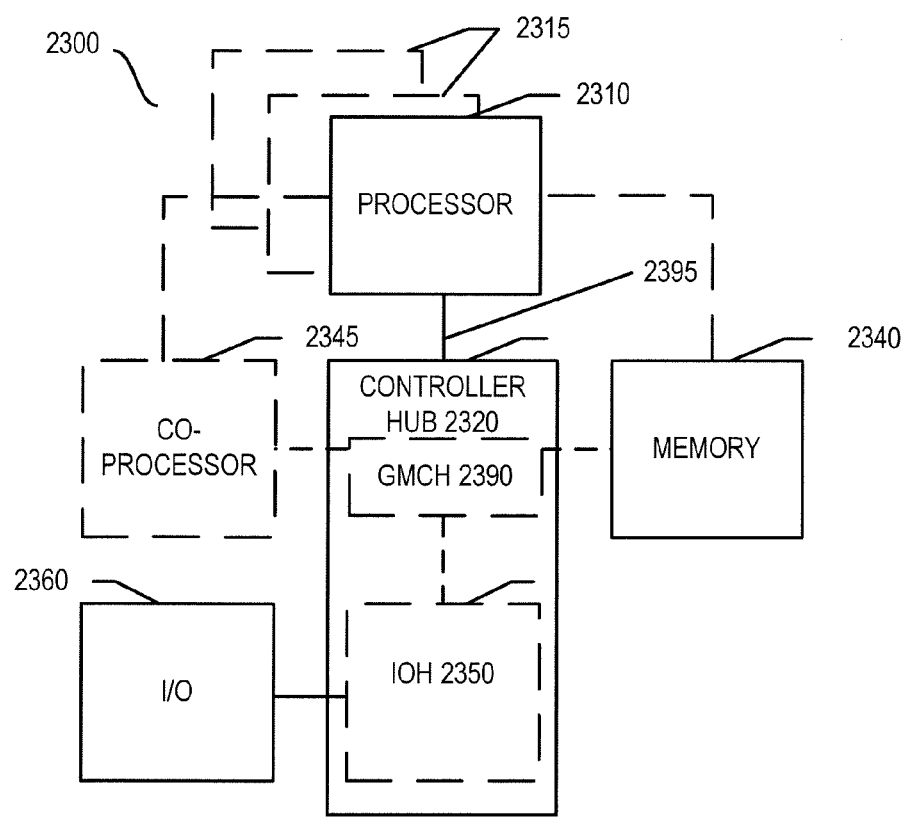
FIG. 23 shown is a block diagram of a system in accordance with one embodiment of the present invention.

Referring now to FIG. 23, shown is a block diagram of a system 2300 in accordance with one embodiment of the present invention. The system 2300 may include one or more processors 2310, 2315, which are coupled to a controller hub 2320. In one embodiment the controller hub 2320 includes a graphics memory controller hub (GMCH) 2390 and an Input/Output Hub (IOH) 2350 (which may be on separate chips); the GMCH 2390 includes memory and graphics controllers to which are coupled memory 2340 and a coprocessor 2345; the IOH 2350 is couples input/output (I/O) devices 2360 to the GMCH 2390. Alternatively, one or both of the memory and graphics controllers are integrated within the processor (as described herein), the memory 2340 and the coprocessor 2345 are coupled directly to the processor 2310, and the controller hub 2320 in a single chip with the IOH 2350.

The optional nature of additional processors 2315 is denoted in FIG. 23 with broken lines. Each processor 2310, 2315 may include one or more of the processing cores described herein and may be some version of the processor 2200.

The memory 2340 may be, for example, dynamic random access memory (DRAM), phase change memory (PCM), or a combination of the two. For at least one embodiment, the controller hub 2320 communicates with the processor(s) 2310, 2315 via a multi-drop bus, such as a frontside bus (FSB), point-to-point interface such as QuickPath Interconnect (QPI), or similar connection 2395.

In one embodiment, the coprocessor 2345 is a special-purpose processor, such as, for example, a high-throughput MIC processor, a network or communication processor, compression engine, graphics processor, GPGPU, embedded processor, or the like. In one embodiment, controller hub 2320 may include an integrated graphics accelerator.

There can be a variety of differences between the physical resources 2310, 2315 in terms of a spectrum of metrics of merit including architectural, microarchitectural, thermal, power consumption characteristics, and the like.

In one embodiment, the processor 2310 executes instructions that control data processing operations of a general type. Embedded within the instructions may be coprocessor instructions. The processor 2310 recognizes these coprocessor instructions as being of a type that should be executed by the attached coprocessor 2345. Accordingly, the processor 2310 issues these coprocessor instructions (or control signals representing coprocessor instructions) on a coprocessor bus or other interconnect, to coprocessor 2345. Coprocessor(s) 2345 accept and execute the received coprocessor instructions.

Figure 24:
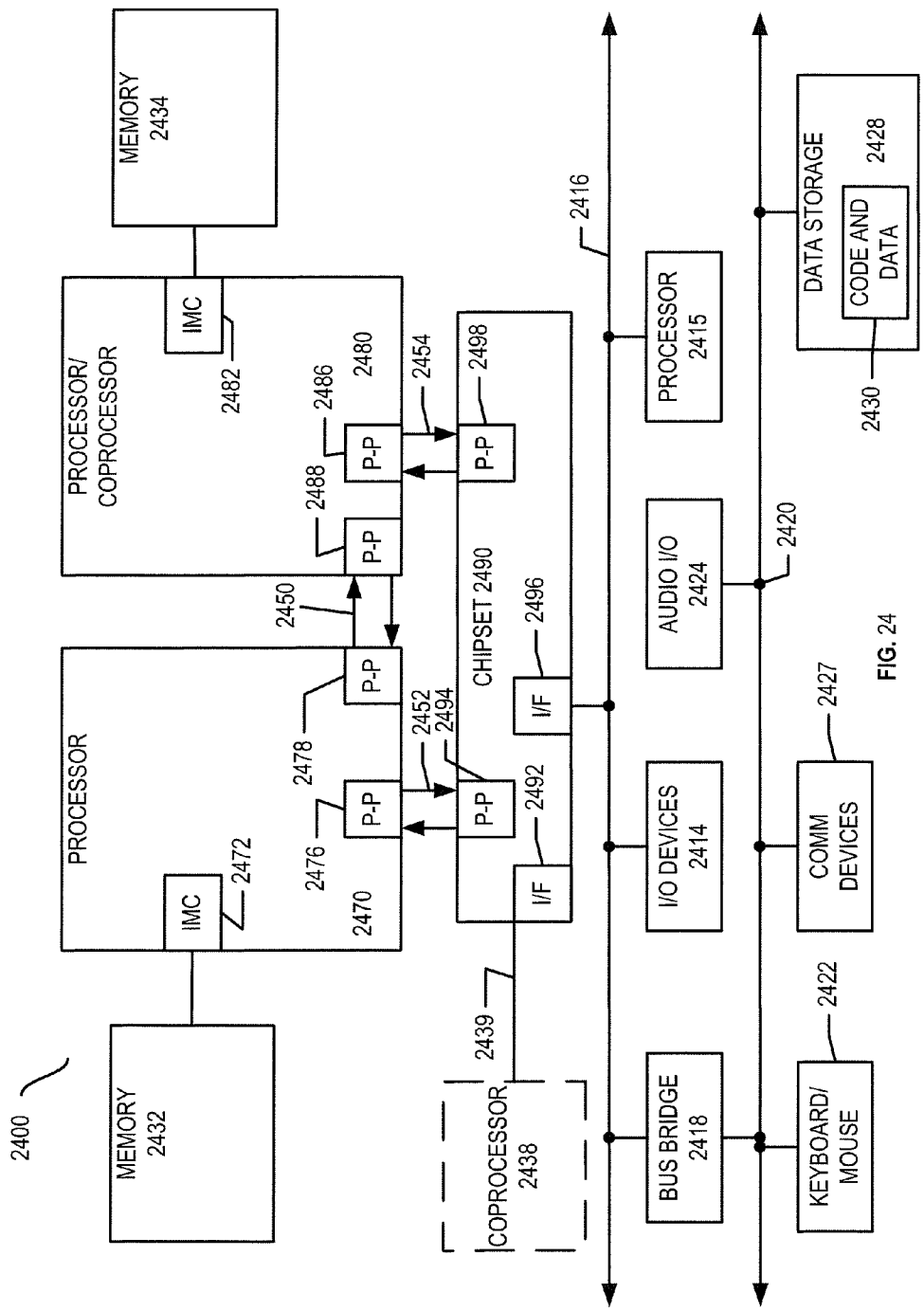
FIG. 24 shown is a block diagram of a first more specific exemplary system in accordance with an embodiment of the present invention.

Referring now to FIG. 24, shown is a block diagram of a first more specific exemplary system 2400 in accordance with an embodiment of the present invention. As shown in FIG. 24, multiprocessor system 2400 is a point-to-point interconnect system, and includes a first processor 2470 and a second processor 2480 coupled via a point-to-point interconnect 2450. Each of processors 2470 and 2480 may be some version of the processor 2200. In one embodiment of the invention, processors 2470 and 2480 are respectively processors 2310 and 2315, while coprocessor 2438 is coprocessor 2345. In another embodiment, processors 2470 and 2480 are respectively processor 2310 coprocessor 2345.

Processors 2470 and 2480 are shown including integrated memory controller (IMC) units 2472 and 2482, respectively. Processor 2470 also includes as part of its bus controller units point-to-point (P-P) interfaces 2476 and 2478; similarly, second processor 2480 includes P-P interfaces 2486 and 2488. Processors 2470, 2480 may exchange information via a point-to-point (P-P) interface 2450 using P-P interface circuits 2478, 2488. As shown in FIG. 24, IMCs 2472 and 2482 couple the processors to respective memories, namely a memory 2432 and a memory 2434, which may be portions of main memory locally attached to the respective processors.

Processors 2470, 2480 may each exchange information with a chipset 2490 via individual P-P interfaces 2452, 2454 using point to point interface circuits 2476, 2494, 2486, 2498. Chipset 2490 may optionally exchange information with the coprocessor 2438 via a high-performance interface 2439. In one embodiment, the coprocessor 2438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2490 may be coupled to a first bus 2416 via an interface 2496. In one embodiment, first bus 2416 may be a Peripheral Component Interconnect (PCI) bus, or a bus such as a PCI Express bus or another third generation I/O interconnect bus, although the scope of the present invention is not so limited.

As shown in FIG. 24, various I/O devices 2414 may be coupled to first bus 2416, along with a bus bridge 2418 which couples first bus 2416 to a second bus 2420. In one embodiment, one or more additional processor(s) 2415, such as coprocessors, high-throughput MIC processors, GPGPU's, accelerators (such as, e.g., graphics accelerators or digital signal processing (DSP) units), field programmable gate arrays, or any other processor, are coupled to first bus 2416. In one embodiment, second bus 2420 may be a low pin count (LPC) bus. Various devices may be coupled to a second bus 2420 including, for example, a keyboard and/or mouse 2422, communication devices 2427 and a storage unit 2428 such as a disk drive or other mass storage device which may include instructions/code and data 2430, in one embodiment. Further, an audio I/O 2424 may be coupled to the second bus 2420. Note that other architectures are possible. For example, instead of the point-to-point architecture of FIG. 24, a system may implement a multi-drop bus or other such architecture.

Figure 25:
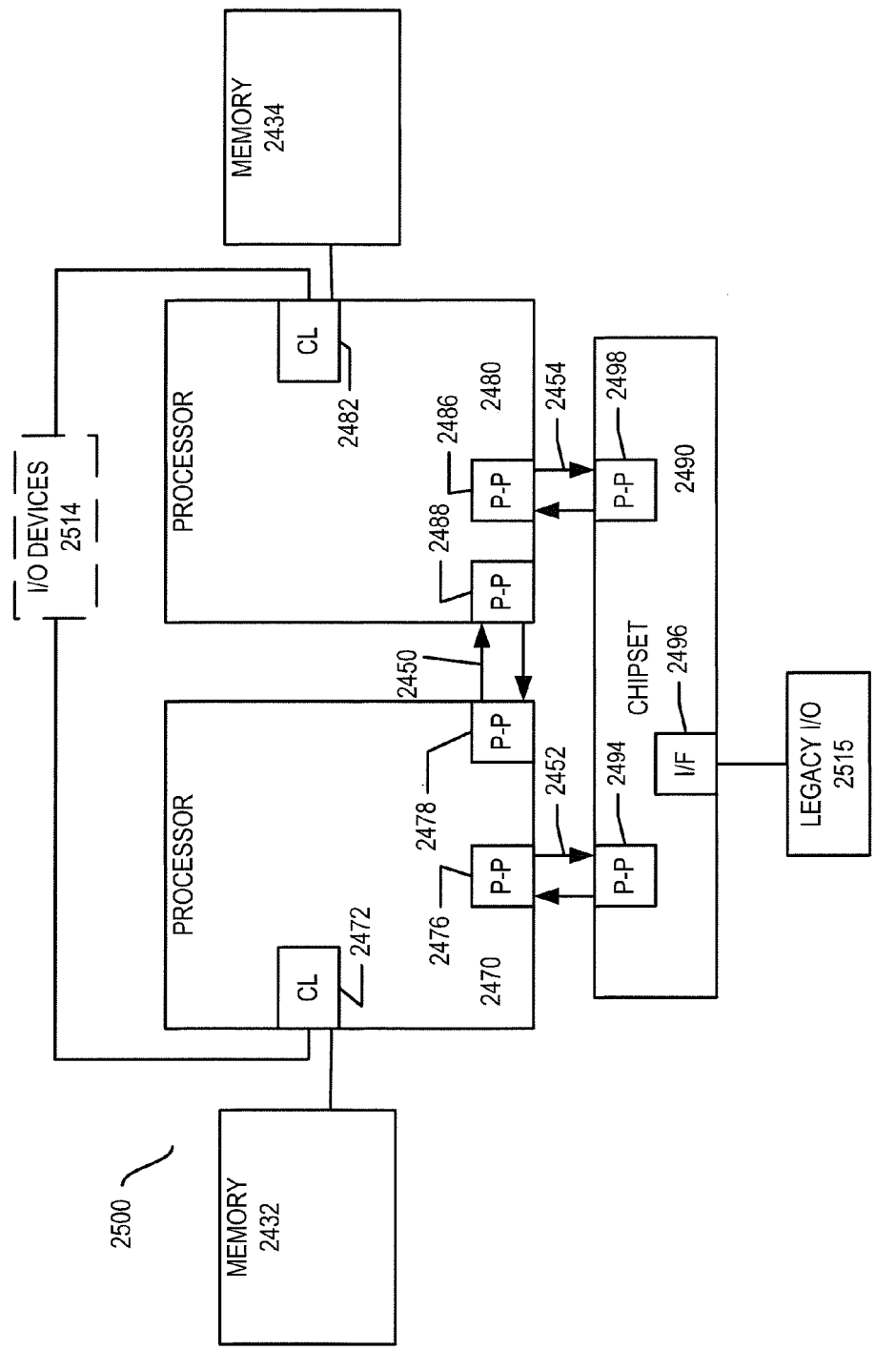
FIG. 25 shown is a block diagram of a second more specific exemplary system in accordance with an embodiment of the present invention.

Referring now to FIG. 25, shown is a block diagram of a second more specific exemplary system 2500 in accordance with an embodiment of the present invention. Like elements in FIGS. 24 and 25 bear like reference numerals, and certain aspects of FIG. 24 have been omitted from FIG. 25 in order to avoid obscuring other aspects of FIG. 25.

FIG. 25 illustrates that the processors 2470, 2480 may include integrated memory and I/O control logic ("CL") 2472 and 2482, respectively. Thus, the CL 2472, 2482 include integrated memory controller units and include I/O control logic. FIG. 25 illustrates that not only are the memories 2432, 2434 coupled to the CL 2472, 2482, but also that I/O devices 2514 are also coupled to the control logic 2472, 2482. Legacy I/O devices 2515 are coupled to the chipset 2490.

Figure 26:
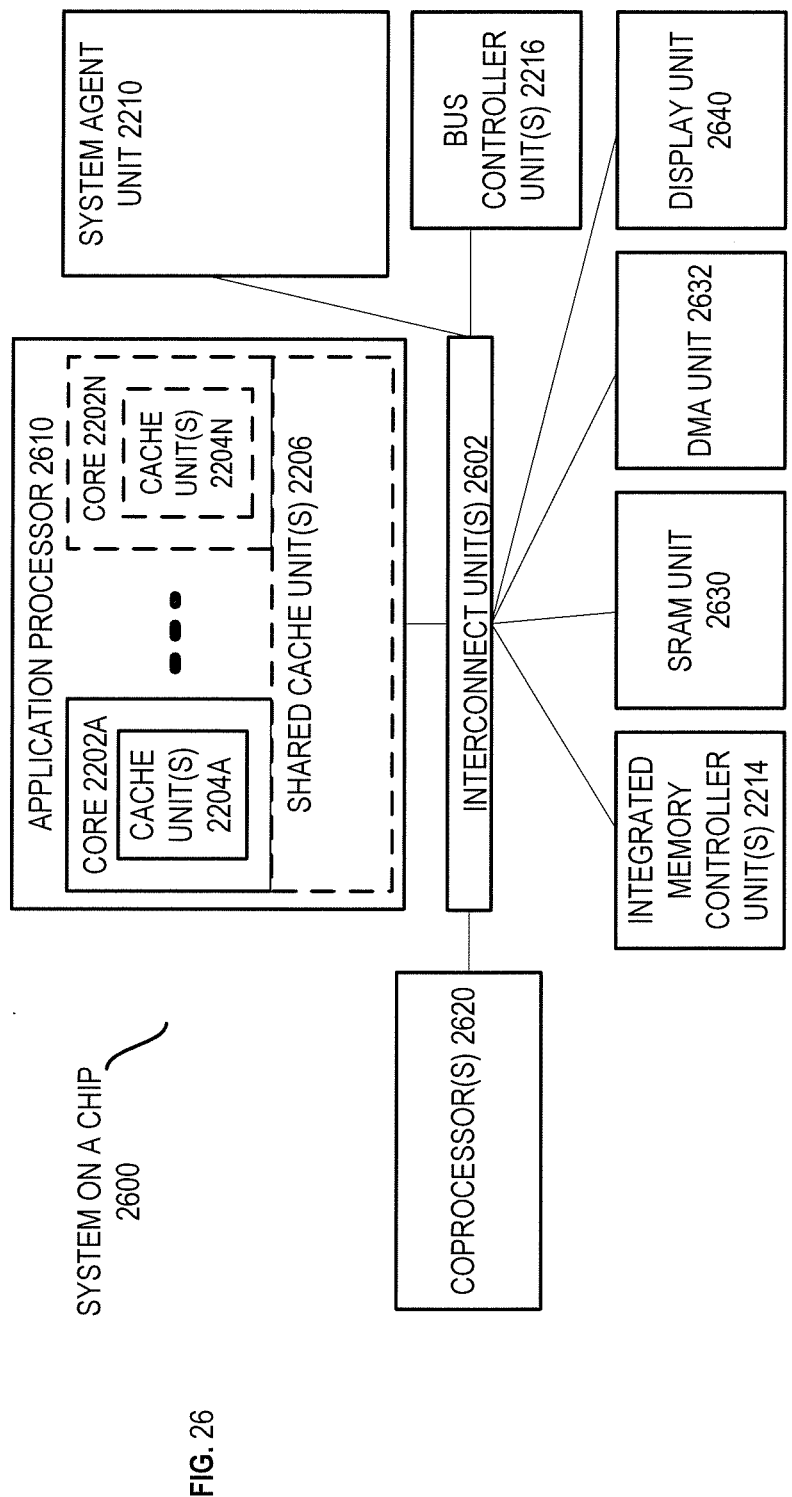
FIG. 26, shown is a block diagram of a SoC in accordance with an embodiment of the present invention.

Referring now to FIG. 26, shown is a block diagram of a SoC 2600 in accordance with an embodiment of the present invention. Similar elements in FIG. 22 bear like reference numerals. Also, dashed lined boxes are optional features on more advanced SoCs. In FIG. 26, an interconnect unit(s) 2602 is coupled to: an application processor 2610 which includes a set of one or more cores 202A-N and shared cache unit(s) 2206; a system agent unit 2210; a bus controller unit(s) 2216; an integrated memory controller unit(s) 2214; a set or one or more coprocessors 2620 which may include integrated graphics logic, an image processor, an audio processor, and a video processor; an static random access memory (SRAM) unit 2630; a direct memory access (DMA) unit 2632; and a display unit 2640 for coupling to one or more external displays. In one embodiment, the coprocessor(s) 2620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2430 illustrated in FIG. 24, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

In the illustrated embodiment, the instruction converter is a software instruction converter, although alternatively the instruction converter may be implemented in software, firmware, hardware, or various combinations thereof. FIG. 27 shows a program in a high level language 2702 may be compiled using an x86 compiler 2704 to generate x86 binary code 2706 that may be natively executed by a processor with at least one x86 instruction set core 2716. The processor with at least one x86 instruction set core 2716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2704 represents a compiler that is operable to generate x86 binary code 2706 (e.g., object code) that can, with or without additional linkage processing, be executed on the processor with at least one x86 instruction set core 2716. Similarly, FIG. 27 shows the program in the high level language 2702 may be compiled using an alternative instruction set compiler 2708 to generate alternative instruction set binary code 2710 that may be natively executed by a processor without at least one x86 instruction set core 2714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2712 is used to convert the x86 binary code 2706 into code that may be natively executed by the processor without an x86 instruction set core 2714. This converted code is not likely to be the same as the alternative instruction set binary code 2710 because an instruction converter capable of this is difficult to make; however, the converted code will accomplish the general operation and be made up of instructions from the alternative instruction set. Thus, the instruction converter 2712 represents software, firmware, hardware, or a combination thereof that, through emulation, simulation or any other process, allows a processor or other electronic device that does not have an x86 instruction set processor or core to execute the x86 binary code 2706.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decoder through one or more intervening components. In the figures, arrows are used to show couplings and/or connections.

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description.

Certain operations may be performed by hardware components and/or may be embodied in a machine-executable or circuit-executable instruction that may be used to cause and/or result in a hardware component (e.g., a processor, portion of a processor, circuit, etc.) programmed with the instruction performing the operations. The hardware component may include a general-purpose or special-purpose hardware component. The operations may be performed by a combination of hardware, software, and/or firmware. The hardware component may include specific or particular logic (e.g., circuitry potentially combined with software and/or firmware) that is operable to execute and/or process the instruction and store a result in response to the instruction (e.g., in response to one or more microinstructions or other control signals derived from the instruction).

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
receiving a floating point scaling instruction, the floating point scaling instruction indicating a first source including one or more floating point data elements that are not required to have integer values, indicating a second source including one or more corresponding floating point data elements, and indicating a destination; and
storing a result in the destination in response to the floating point scaling instruction, the result including one or more result floating point data elements having a same floating point format as the one or more floating point data elements of the second source, each of the one or more result floating point data elements including a corresponding floating point data element of the second source multiplied by a base raised to a power of an integer representative of the corresponding floating point data element of the first source.

2. The method of claim 1, further comprising determining the one or more integers that are representative of the one or more corresponding floating point data elements of the first source in response to the floating point scaling instruction.

3. The method of claim 2, wherein determining the one or more integers comprises determining an integer selected from: (1) a maximum integer that is less than or equal to the corresponding floating point data element of the first source; and (2) a minimum integer that is greater than or equal to the corresponding floating point data element of the first source.

4. The method of claim 1, wherein each of the first and second sources includes a plurality of packed floating point data elements, and wherein the result includes a same plurality of packed result floating point data elements.

5. The method of claim 1, wherein receiving comprises receiving the floating point scaling instruction indicating the first source which includes a floating point data element that is one of a Not a Number (NaN), a positive infinity, a negative infinity, and a denormal number.

6. The method of claim 1, wherein receiving comprises receiving the floating point scaling instruction indicating the second source which includes a floating point data element that is a Not a Number (NaN), and wherein storing comprises storing the result including a corresponding result floating point data element that is also a NaN.

7. The method of claim 1, wherein receiving comprises receiving the floating point scaling instruction further indicating a third set of one or more corresponding floating point data elements, and wherein storing comprises storing the result including the one or more result floating point data elements that each include the corresponding floating point data element of the second source multiplied by the base raised to the power of the integer representative of the corresponding floating point data element of the first source and added to the corresponding floating point data element of the third set.

8. The method of claim 1, wherein the base is two.

9. The method of claim 1, wherein receiving comprises receiving the floating point scaling instruction indicating the first source including a single floating point data element and indicating the second source including a plurality of packed floating point data elements, and wherein storing comprises storing the result including a plurality of packed result floating point data elements that each correspond to one of the plurality of packed floating point data elements of the second source, each of the plurality of packed result floating point data elements including the corresponding floating point data element of the second source multiplied by the base raised to the power of an integer representative of the single floating point data element of the first source.

10. The method of claim 1, wherein receiving comprises receiving the floating point scaling instruction further indicating a packed data operation mask, and wherein storing the result comprises conditionally storing scaled floating point data elements in the result according to the packed data operation mask.

11. An apparatus comprising:
a plurality of registers; and
a floating point execution unit coupled with the plurality of registers, the floating point execution unit operable, in response to a floating point scaling instruction that is to indicate a first source that is to include one or more floating point data elements that are not required to have integer values, that is to indicate a second source that is to include one or more corresponding floating point data elements, and that is to indicate a destination, to store a result in the destination, the result to include one or more result floating point data elements that are to be of a same data element size as the one or more floating point data elements of the second source, each of the one or more result floating point data elements to include a corresponding floating point data element of the second source multiplied by a base raised to a power of an integer representative of the corresponding floating point data element of the first source.

12. The apparatus of claim 11, wherein the floating point execution unit, in response to the floating point scaling instruction, is to determine the one or more integers that are representative of the one or more corresponding floating point data elements of the first source.

13. The apparatus of claim 11, wherein the floating point scaling instruction is to indicate the first source which is to include a floating point data element that is one of a Not a Number (NaN), a positive infinity, a negative infinity, and a denormal number.

14. The apparatus of claim 11, wherein the floating point scaling instruction is to indicate the second source which is to include a floating point data element that is a Not a Number (NaN), and wherein the floating point execution unit, in response to the floating point scaling instruction, is to store the result that is to include a corresponding result floating point data element that is also a NaN.

15. The apparatus of claim 11, wherein the floating point scaling instruction is to indicate the second source which is to include a floating point data element that is a positive infinity and is to indicate the first source which is to include a corresponding floating point data element that is a Not a Number (NaN), and wherein the floating point execution unit, in response to the floating point scaling instruction, is to store the result that is to include a corresponding result floating point data element that is a Not a Number (NaN).

16. The apparatus of claim 11, wherein the floating point scaling instruction further is to indicate a third set of one or more corresponding floating point data elements, and wherein the floating point execution unit, in response to the floating point scaling instruction, is to store the result that is to include the one or more result floating point data elements that each are to include the corresponding floating point data element of the second source multiplied by the base raised to the power of the integer representative of the corresponding floating point data element of the first source and added to the corresponding floating point data element of the third set.

17. The apparatus of claim 11, wherein the floating point scaling instruction is to indicate the first source which is to include one of: (1) at least eight double precision floating point data elements; and (2) at least sixteen single precision floating point data elements.

18. The apparatus of claim 11, wherein the base is two.

19. The apparatus of claim 11, wherein each of the first and second sources is to include a single floating point data element, and wherein the floating point execution unit, in response to the floating point scaling instruction, is to store the result that is to include a single result floating point data element.

20. The apparatus of claim 11, wherein each of the first and second sources is to include a plurality of packed floating point data elements, and wherein the floating point execution unit, in response to the floating point scaling instruction, is to store the result that is to include a same plurality of packed result floating point data elements.

21. The apparatus of claim 11, wherein both the one or more result floating point data elements and the one or more floating point data elements of the second source are double precision floating point data elements.

22. A system comprising:
an interconnect;
a processor coupled with the interconnect, the processor operable, in response to a floating point scaling instruction that is to indicate a first source including that is to include one or more floating point data elements, that is to indicate a second source that is to include one or more corresponding floating point data elements, and that is to indicate a destination, to store a result in the destination, the result to include one or more result floating point data elements that are to have a same floating point format as the one or more floating point data elements of the second source, each of the one or more result floating point data elements to include a corresponding floating point data element of the second source multiplied by a base raised to a power of an integer representative of the corresponding floating point data element of the first source; and
a dynamic random access memory (DRAM) coupled with the interconnect.

23. The system of claim 22, wherein the processor, in response to a floating point scaling instruction, is to determine the one or more integers that are representative of the one or more corresponding floating point data elements of the first source.

24. An article of manufacture comprising:
a machine-readable storage medium including one or more solid data storage materials, the machine-readable storage medium storing a floating point scaling instruction,
the floating point scaling instruction to indicate a first source that is to include one or more floating point data elements that are not required to have integer values, to indicate a second source that is to include one or more corresponding floating point data elements, and to indicate a destination storage location, and the floating point scaling instruction if executed by a machine operable to cause the machine to perform operations comprising:
store a result in the destination storage location, the result to include one or more result floating point data elements that are to have a same floating point format as the one or more floating point data elements of the second source, each of the one or more result floating point data elements to include a corresponding floating point data element of the second source multiplied by a base raised to a power of an integer representative of the corresponding floating point data element of the first source.

25. The article of manufacture of claim 24, wherein the floating point scaling instruction if executed by the machine is operable to cause the machine to determine the one or more integers that are representative of the one or more corresponding floating point data elements of the first source.

26. The article of manufacture of claim 24, wherein the floating point scaling instruction is to indicate one or more floating point data elements of the first source which are to include one of a positive infinity, a negative infinity, and a Not a Number (NaN), and wherein the floating point scaling instruction if executed by the machine is operable to cause the machine to store the result without generating an exception.

27. A processor comprising:
a decode unit to decode an instruction that is to have a first field to indicate a first source that is to include one or more floating point data elements that are not required to have integer values, that is to have a second field to indicate a second source that is to include one or more corresponding floating point data elements, and that is to indicate a destination; and
a floating point execution unit coupled with the decode unit, the floating point execution unit operable, in response to the instruction, to store a result in the destination, the result to include one or more result floating point data elements, each of the one or more result floating point data elements to have a value of a corresponding floating point data element of the second source multiplied by a base raised to a power of an integer representative of the corresponding floating point data element of the first source.

28. The apparatus of claim 27, wherein the floating point execution unit, in response to the instruction, is to determine the one or more integers that are representative of the one or more corresponding floating point data elements of the first source.

29. The apparatus of claim 27, wherein the decode unit is to decode the instruction that is to indicate the second source which is to include a floating point data element that is a Not a Number (NaN), and wherein the floating point execution unit, in response to the instruction, is to store the result that is to include a corresponding result floating point data element that is also a NaN.

30. The apparatus of claim 27, wherein the decode unit is to decode the instruction that is to indicate the second source which is to include a floating point data element that is a positive infinity and is to indicate the first source which is to include a corresponding floating point data element that is a Not a Number (NaN), and wherein the floating point execution unit, in response to the instruction, is to store the result that is to include a corresponding result floating point data element that is a Not a Number (NaN).

31. The apparatus of claim 27, wherein the one or more result floating point data elements are to have a same floating point format as the one or more floating point data elements of the second source.

* * * * *

UNITED STATES PATENT AND TRADEMARK OFFICE
CERTIFICATE OF CORRECTION

PATENT NO.         : 9,448,765 B2
APPLICATION NO.    : 13/977086
DATED              : September 20, 2016
INVENTOR(S)        : Christina S. Anderson et al.

Page 1 of 1

It is certified that error appears in the above-identified patent and that said Letters Patent is hereby corrected as shown below:

In the Claims

In column 43, line 27, in claim 22, after "source" delete "including".

Signed and Sealed this
Twenty-second Day of November, 2016

Michelle K. Lee
*Director of the United States Patent and Trademark Office*